(12) United States Patent
Lewis et al.

(10) Patent No.: US 10,919,369 B2
(45) Date of Patent: Feb. 16, 2021

(54) CLAMP ASSEMBLY FOR TONNEAU COVER

(71) Applicant: Lund, Inc., Buford, GA (US)

(72) Inventors: Jacob Lewis, White Pigeon, MI (US); Chris Slinger, Kendallville, IN (US)

(73) Assignee: Lund, Inc., Buford, GA (US)

(*) Notice: Subject to any disclaimer, the term of this patent is extended or adjusted under 35 U.S.C. 154(b) by 124 days.

(21) Appl. No.: 16/383,972

(22) Filed: Apr. 15, 2019

(65) Prior Publication Data
US 2019/0315209 A1    Oct. 17, 2019

Related U.S. Application Data

(60) Provisional application No. 62/702,059, filed on Jul. 23, 2018, provisional application No. 62/658,031, filed on Apr. 16, 2018.

(51) Int. Cl.
*B60P 7/02* (2006.01)
*B60J 7/10* (2006.01)
(Continued)

(52) U.S. Cl.
CPC ............ *B60J 7/104* (2013.01); *B60J 7/141* (2013.01); *B60J 7/202* (2013.01); *B60P 7/04* (2013.01)

(58) Field of Classification Search
CPC .. B60J 7/102; B60J 7/198; B60J 7/141; B60P 7/04; F41B 5/14; F16M 13/02; F41A 23/18; A47G 25/18
See application file for complete search history.

(56) References Cited

U.S. PATENT DOCUMENTS

| 171,736 A | 1/1876 | Mooney |
| 309,767 A | 12/1884 | Clarke |

(Continued)

FOREIGN PATENT DOCUMENTS

| CN | 108791034 | 11/2018 |
| CN | 109230011 A | 1/2019 |

(Continued)

OTHER PUBLICATIONS

Features Comparison. Roll-N-Lock E-Series vs. Pace Edwards Bedlocker. http://rollnlock.com/wp-content/uploads/2013/07/FeatureComparison_E-Series_Eng1.pdf.
(Continued)

*Primary Examiner* — Kiran B Patel
(74) *Attorney, Agent, or Firm* — Knobbe, Martens, Olson & Bear, LLP

(57) ABSTRACT

Disclosed herein are embodiments of a clamp assembly for attaching a tonneau cover to a vehicle. The clamp assembly can include a bow hanger comprising a main body extending between first and second ends and a protrusion extending away from the main body and along a portion of a length thereof. The clamp assembly can have a bow slide comprising a head configured to surround and move along the bow hanger. The clamp assembly can have a slot configured to receive the protrusion of the bow hanger, wherein engagement between the protrusion and the slot of the bow slide prevents the bow slide from rotating around the bow hanger. In some embodiments, the clamp assembly includes a handle coupled to the bow slide and a cam follower. The cam follower can engage rails of the handle which can be disposed either internally or externally of the handle.

24 Claims, 24 Drawing Sheets

(51) Int. Cl.
*B60J 7/14* (2006.01)
*B60P 7/04* (2006.01)
*B60J 7/20* (2006.01)

(56) References Cited

U.S. PATENT DOCUMENTS

| | | | |
|---|---|---|---|
| 341,307 | A | 5/1886 | Altschwager |
| 540,707 | A | 6/1895 | Wolf |
| 600,898 | A | 3/1898 | Smith |
| 1,127,854 | A | 2/1915 | Belankski |
| 1,214,600 | A | 2/1917 | Silverthorne |
| 1,242,035 | A | 10/1917 | Pierson et al. |
| 1,266,521 | A | 5/1918 | Norquist |
| 1,272,620 | A | 7/1918 | Carlson |
| 1,289,997 | A | 12/1918 | Wyeth |
| 1,655,777 | A | 1/1928 | Weiland |
| 1,655,797 | A | 1/1928 | Peck |
| 1,764,615 | A | 6/1930 | Edwards |
| 1,812,580 | A | 6/1931 | Black |
| 1,930,841 | A | 10/1933 | Miniere |
| 2,067,994 | A | 1/1937 | Thwaits |
| 2,483,947 | A | 10/1949 | Turner |
| 2,514,466 | A | 7/1950 | Bildhauer |
| D160,213 | S | 9/1950 | Samuelson |
| 2,530,365 | A | 11/1950 | Johnson et al. |
| 2,621,357 | A | 12/1952 | Stuman |
| 2,626,179 | A | 1/1953 | Gonzalez |
| 2,663,447 | A | 12/1953 | Westcott |
| RE23,814 | E | 4/1954 | Ingram |
| 2,713,897 | A | 7/1955 | Teague et al. |
| 2,720,414 | A | 10/1955 | Hart |
| 2,795,363 | A | 6/1957 | Turner |
| 2,795,383 | A | 6/1957 | Turner |
| 2,797,959 | A | 7/1957 | Brice |
| 2,872,239 | A | 2/1959 | Bowness et al. |
| 2,874,885 | A | 2/1959 | Young |
| 3,148,724 | A | 9/1964 | Chieger et al. |
| 3,329,385 | A | 7/1967 | Dietsch |
| 3,357,670 | A | 12/1967 | Larson et al. |
| 3,656,801 | A | 4/1972 | Doutt et al. |
| 3,675,959 | A | 7/1972 | Hansen et al. |
| 3,734,560 | A | 5/1973 | Cramblet |
| 3,773,143 | A | 11/1973 | Del Prete et al. |
| 3,902,599 | A | 9/1975 | Stromberg |
| 4,023,850 | A | 5/1977 | Tillery |
| 4,063,774 | A | 12/1977 | Hanks |
| 4,132,335 | A | 1/1979 | Ingram |
| 4,136,905 | A | 1/1979 | Morgan |
| 4,145,044 | A | 3/1979 | Wilson et al. |
| 4,270,681 | A | 6/1981 | Ingram |
| 4,295,587 | A | 10/1981 | Bott |
| D266,836 | S | 11/1982 | Ingram |
| D267,247 | S | 12/1982 | Kowalski et al. |
| 4,419,794 | A | 12/1983 | Horton, Jr. et al. |
| 4,451,075 | A | 5/1984 | Canfield |
| 4,470,716 | A | 9/1984 | Welch |
| 4,472,639 | A | 9/1984 | Bianchi |
| 4,531,773 | A | 7/1985 | Smith |
| 4,585,263 | A | 4/1986 | Hesner |
| 4,592,529 | A | 6/1986 | Suzuki |
| 4,596,417 | A | 6/1986 | Bennett |
| 4,635,992 | A | 1/1987 | Hamilton |
| 4,650,144 | A | 3/1987 | Conrad |
| 4,652,035 | A | 3/1987 | Austin, Jr. |
| 4,659,136 | A | 4/1987 | Martin et al. |
| D291,789 | S | 9/1987 | Noga |
| D294,137 | S | 2/1988 | Robson |
| 4,749,226 | A | 6/1988 | Heft |
| 4,750,773 | A | 6/1988 | Chapline |
| 4,770,458 | A | 9/1988 | Burke et al. |
| 4,778,213 | A | 10/1988 | Palmer |
| 4,786,119 | A | 11/1988 | Smuda |
| 4,793,397 | A | 12/1988 | Whiteman |
| 4,795,206 | A | 1/1989 | Adams et al. |
| D300,734 | S | 4/1989 | Kruitbosch |
| 4,824,158 | A | 4/1989 | Peters et al. |
| 4,828,312 | A | 5/1989 | Kinkel |
| 4,830,242 | A | 5/1989 | Painter |
| 4,850,770 | A | 7/1989 | Millar, Jr. |
| 4,875,724 | A | 10/1989 | Gruber |
| D305,111 | S | 12/1989 | Zagner |
| 4,884,317 | A | 12/1989 | Liu |
| D308,627 | S | 6/1990 | Guffey |
| 4,953,820 | A | 9/1990 | Yoder |
| 4,961,677 | A | 10/1990 | Downard, Jr. |
| 5,005,892 | A | 4/1991 | Haugen et al. |
| 5,011,349 | A | 4/1991 | McAndrews |
| 5,024,409 | A | 6/1991 | Bohnen |
| 5,037,152 | A | 8/1991 | Hendricks |
| 5,037,153 | A | 8/1991 | Stark |
| D321,496 | S | 11/1991 | Sparham et al. |
| 5,083,829 | A | 1/1992 | Fonseca |
| D326,076 | S | 5/1992 | Wiese |
| 5,114,203 | A | 5/1992 | Carnes |
| 5,121,960 | A * | 6/1992 | Wheatley ............... B60P 7/04 160/368.1 |
| 5,123,691 | A | 6/1992 | Ginn |
| 5,127,697 | A | 7/1992 | St. Marie |
| 5,129,665 | A | 7/1992 | Sutter et al. |
| 5,147,103 | A | 9/1992 | Ducote |
| 5,154,470 | A | 10/1992 | Bringman, Jr. |
| 5,169,200 | A | 12/1992 | Pugh |
| 5,170,746 | A | 12/1992 | Roose |
| 5,201,532 | A | 4/1993 | Salesky et al. |
| 5,201,562 | A | 4/1993 | Dorsey |
| D337,934 | S | 8/1993 | Young |
| 5,234,122 | A | 8/1993 | Cherng |
| 5,251,950 | A | 10/1993 | Bernardo |
| 5,253,913 | A | 10/1993 | Metivier |
| 5,275,458 | A * | 1/1994 | Barben ............... B60J 7/104 160/379 |
| 5,299,773 | A | 4/1994 | Bertrand |
| 5,301,913 | A * | 4/1994 | Wheatley ............... B60R 9/00 248/231.41 |
| 5,310,155 | A | 5/1994 | Wu |
| 5,310,238 | A * | 5/1994 | Wheatley ............... B60J 7/104 296/100.18 |
| 5,330,246 | A | 7/1994 | Bernardo |
| 5,357,376 | A | 10/1994 | Yoshida |
| 5,380,141 | A | 1/1995 | Flowers |
| 5,385,377 | A | 1/1995 | Girard |
| 5,396,915 | A | 3/1995 | Bomar |
| 5,417,340 | A | 5/1995 | Anthony |
| 5,421,633 | A | 6/1995 | Moore et al. |
| D360,614 | S | 7/1995 | Alcocer |
| 5,441,324 | A | 8/1995 | Gold |
| 5,443,341 | A | 8/1995 | Hamilton |
| 5,456,511 | A | 10/1995 | Webber |
| 5,460,393 | A | 10/1995 | Tsai |
| 5,460,423 | A * | 10/1995 | Kersting ............... B60J 7/104 296/100.18 |
| 5,468,038 | A | 11/1995 | Sauri |
| D365,323 | S | 12/1995 | Napierkowski et al. |
| 5,487,585 | A * | 1/1996 | Wheatley ............... B60J 7/104 160/368.1 |
| 5,500,983 | A | 3/1996 | Lautenschlager |
| 5,522,635 | A * | 6/1996 | Downey ............... B60J 7/102 160/368.1 |
| 5,540,475 | A | 7/1996 | Kersting |
| 5,573,161 | A | 11/1996 | Stapleton |
| 5,579,970 | A | 12/1996 | Cucheran et al. |
| 5,588,630 | A | 12/1996 | Chen-Chao |
| 5,622,296 | A | 4/1997 | Pirhonen et al. |
| 5,636,893 | A * | 6/1997 | Wheatley ............... B60J 7/141 16/354 |
| 5,655,808 | A | 8/1997 | Wheatley |
| 5,658,033 | A | 8/1997 | Delaune |
| 5,673,958 | A | 10/1997 | Gramss |
| 5,685,686 | A | 11/1997 | Burns |
| 5,700,047 | A | 12/1997 | Leitner et al. |
| 5,730,342 | A | 3/1998 | Tien |
| 5,743,589 | A | 4/1998 | Felker |
| D394,639 | S | 5/1998 | Carter |

(56) References Cited

U.S. PATENT DOCUMENTS

| | | |
|---|---|---|
| 5,752,800 A | 5/1998 | Brincks et al. |
| 5,755,480 A | 5/1998 | Bryan |
| 5,765,892 A | 6/1998 | Covington |
| 5,772,062 A | 6/1998 | Gramss |
| 5,775,759 A | 7/1998 | Cummings |
| 5,782,282 A | 7/1998 | Chen |
| 5,788,311 A | 8/1998 | Tibbals |
| D398,284 S | 9/1998 | Carter et al. |
| 5,806,907 A | 9/1998 | Martinus et al. |
| D399,481 S | 10/1998 | Larson et al. |
| 5,816,637 A | 10/1998 | Adams et al. |
| 5,820,188 A | 10/1998 | Nash |
| 5,823,596 A | 10/1998 | Kulesza |
| 5,839,614 A | 11/1998 | Brown |
| 5,853,116 A | 12/1998 | Schreiner |
| 5,857,724 A | 1/1999 | Jarman |
| 5,857,729 A | 1/1999 | Bogard |
| 5,862,964 A | 1/1999 | Moliner |
| 5,873,688 A | 2/1999 | Wheatley |
| 5,893,500 A | 4/1999 | Cucheran et al. |
| D410,429 S | 6/1999 | Derecktor |
| 5,911,464 A | 6/1999 | White |
| 5,913,465 A | 6/1999 | Potter |
| 5,924,614 A | 7/1999 | Kuntze et al. |
| 5,924,753 A | 7/1999 | DiBassie |
| 5,975,618 A | 11/1999 | Rippberger |
| 5,984,379 A | 11/1999 | Michel et al. |
| D417,859 S | 12/1999 | Leitner et al. |
| D418,106 S | 12/1999 | Leitner et al. |
| 5,997,066 A | 12/1999 | Scott |
| 6,019,410 A | 2/2000 | Trostle et al. |
| 6,024,401 A | 2/2000 | Wheatley et al. |
| 6,024,402 A | 2/2000 | Wheatley |
| 6,039,520 A | 3/2000 | Cheng |
| 6,053,558 A | 4/2000 | Weldy et al. |
| 6,059,159 A | 5/2000 | Fisher |
| 6,076,881 A | 6/2000 | Tucker |
| 6,082,801 A | 7/2000 | Owen et al. |
| 6,092,263 A | 7/2000 | Boue et al. |
| 6,102,265 A | 8/2000 | Stapleton |
| 6,112,964 A | 9/2000 | Cucheran et al. |
| 6,112,965 A | 9/2000 | Lundgren |
| 6,113,173 A | 9/2000 | Leitner et al. |
| 6,113,176 A | 9/2000 | Bernardo |
| 6,113,328 A | 9/2000 | Claucherty |
| 6,120,076 A | 9/2000 | Adsit et al. |
| 6,123,305 A | 9/2000 | Lukasavitz |
| 6,129,490 A | 10/2000 | Erskine et al. |
| 6,149,219 A | 11/2000 | Schambre et al. |
| 6,149,220 A | 11/2000 | Weldy et al. |
| 6,227,593 B1 | 5/2001 | De Valcourt |
| 6,227,602 B1 | 5/2001 | Bogard |
| 6,256,844 B1 | 7/2001 | Wheatley |
| 6,257,637 B1 | 7/2001 | Reed |
| 6,264,266 B1 | 7/2001 | Rusu et al. |
| 6,269,990 B1 | 8/2001 | Gray |
| 6,273,491 B1 | 8/2001 | Bath et al. |
| 6,276,735 B1 | 8/2001 | Champion |
| 6,283,525 B1 | 9/2001 | Morse |
| 6,338,515 B1 | 1/2002 | Munhall |
| 6,340,190 B1 | 1/2002 | Rosebrugh et al. |
| 6,340,194 B1 | 1/2002 | Muirhead et al. |
| 6,350,089 B1 | 2/2002 | Tekavec |
| 6,352,295 B1 | 3/2002 | Leitner |
| 6,378,926 B1 | 4/2002 | Renze et al. |
| 6,390,427 B1 | 5/2002 | McConnell et al. |
| 6,402,215 B1 | 6/2002 | Leitner et al. |
| 6,422,627 B1 | 7/2002 | Kuhn et al. |
| 6,425,618 B1 | 7/2002 | Garland et al. |
| 6,454,338 B1 | 9/2002 | Glickman et al. |
| 6,471,277 B1 | 10/2002 | Scensny et al. |
| 6,488,249 B1 | 12/2002 | Girardi et al. |
| 6,494,520 B2 | 12/2002 | Brzenchek et al. |
| 6,499,791 B2 | 12/2002 | Wheatley |
| 6,513,688 B2 | 2/2003 | Kmita et al. |
| 6,540,123 B1 | 4/2003 | Kmita et al. |
| 6,543,836 B1 | 4/2003 | Wheatley |
| 6,550,841 B1 | 4/2003 | Burdon et al. |
| 6,557,918 B2 | 5/2003 | Iafrate et al. |
| 6,561,560 B2 | 5/2003 | Brown et al. |
| 6,568,740 B1 | 5/2003 | Dimmer |
| 6,575,520 B1 | 6/2003 | Spencer |
| 6,585,465 B1 | 7/2003 | Hammond et al. |
| 6,598,922 B2 | 7/2003 | Morse et al. |
| 6,604,898 B2 | 8/2003 | Price |
| 6,607,228 B2 | 8/2003 | Carter, III et al. |
| 6,626,478 B1 | 9/2003 | Minton |
| 6,637,707 B1 | 10/2003 | Gates et al. |
| D485,800 S | 1/2004 | Smith et al. |
| 6,676,182 B2 | 1/2004 | Fitts |
| 6,719,261 B2 | 4/2004 | Wadsworth |
| 6,719,345 B2 | 4/2004 | Ootsuka et al. |
| 6,722,541 B1 | 4/2004 | Aftanas et al. |
| 6,742,973 B1 | 6/2004 | Hendrix et al. |
| 6,752,449 B1 * | 6/2004 | Wheatley .................. B60J 7/102 296/100.17 |
| 6,752,575 B1 | 6/2004 | Moore et al. |
| 6,789,832 B2 | 9/2004 | Gort et al. |
| 6,796,471 B2 | 9/2004 | Aftanas et al. |
| 6,805,392 B2 | 10/2004 | Leitner et al. |
| 6,811,203 B2 | 11/2004 | Wheatley |
| 6,814,389 B2 | 11/2004 | Wheatley |
| 6,824,191 B2 | 11/2004 | Wheatley |
| 6,843,394 B2 | 1/2005 | Aki |
| D501,443 S | 2/2005 | Jones et al. |
| D504,384 S | 4/2005 | StrascheWski |
| 6,874,747 B2 | 4/2005 | Oh |
| 6,889,878 B2 | 5/2005 | Parsons |
| 6,893,073 B2 | 5/2005 | Wheatley |
| 6,913,175 B2 | 7/2005 | Martin |
| 6,918,624 B2 | 7/2005 | Miller et al. |
| 6,923,488 B2 | 8/2005 | Bruford et al. |
| 6,948,763 B2 | 9/2005 | Robbins |
| 6,966,595 B2 | 11/2005 | Bruford et al. |
| 6,976,724 B2 | 12/2005 | Wheatley |
| 6,983,972 B2 | 1/2006 | Tan et al. |
| 6,994,389 B1 | 2/2006 | Graffy et al. |
| 6,997,657 B1 | 2/2006 | Saward |
| 7,007,995 B1 | 3/2006 | Scarberry et al. |
| 7,025,403 B2 | 4/2006 | Wheatley |
| 7,040,849 B2 | 5/2006 | Cunningham et al. |
| 7,063,366 B2 | 6/2006 | Leitner et al. |
| 7,093,870 B2 | 8/2006 | Kim et al. |
| 7,100,956 B1 | 9/2006 | Wilkins |
| 7,111,886 B1 | 9/2006 | Miller et al. |
| 7,121,604 B2 | 10/2006 | Reed |
| 7,152,902 B2 | 12/2006 | Moen et al. |
| 7,159,918 B2 | 1/2007 | Lussier |
| 7,175,218 B1 | 2/2007 | Keene |
| 7,175,377 B2 | 2/2007 | Womack et al. |
| 7,182,380 B2 | 2/2007 | Nagle |
| 7,188,888 B2 | 3/2007 | Wheatley et al. |
| 7,195,432 B2 | 3/2007 | Earle et al. |
| 7,204,540 B2 | 4/2007 | Wheatley |
| D544,826 S | 6/2007 | Smith |
| 7,226,100 B1 | 6/2007 | Willey et al. |
| 7,229,116 B1 | 6/2007 | Bruford et al. |
| 7,240,940 B2 | 7/2007 | Leitner |
| 7,258,387 B2 | 8/2007 | Weldy |
| 7,267,387 B1 | 9/2007 | Bruford et al. |
| D553,072 S | 10/2007 | Smith |
| 7,287,943 B1 | 10/2007 | SaWard |
| 7,303,222 B2 | 12/2007 | Wilkins |
| 7,322,633 B2 | 1/2008 | Zajicek et al. |
| 7,334,830 B2 | 2/2008 | Weldy |
| 7,347,473 B2 | 3/2008 | Miller et al. |
| D568,230 S | 5/2008 | Smith |
| 7,384,090 B2 | 6/2008 | Weldy |
| 7,393,035 B2 | 7/2008 | Leitner et al. |
| 7,413,231 B1 | 8/2008 | Wood et al. |
| 7,427,095 B2 | 9/2008 | Wheatley |
| 7,445,264 B2 | 11/2008 | Spencer et al. |
| 7,464,976 B2 | 12/2008 | Smith |
| 7,484,790 B2 | 2/2009 | Wheatley |

(56) References Cited

U.S. PATENT DOCUMENTS

| | | |
|---|---|---|
| 7,488,021 B1 | 2/2009 | Roos et al. |
| 7,497,493 B1* | 3/2009 | Thiessen .................. B60P 7/15 296/3 |
| 7,506,917 B2 | 3/2009 | Essig |
| 7,513,543 B2 | 4/2009 | Erskine |
| 7,537,264 B2 | 5/2009 | Maimin et al. |
| 7,547,054 B2 | 6/2009 | Leitner |
| 7,549,828 B2 | 6/2009 | Smith |
| D597,924 S | 8/2009 | Smith |
| 7,604,282 B2 | 10/2009 | Spencer et al. |
| 7,607,714 B2 | 10/2009 | Wheatley et al. |
| 7,628,442 B1* | 12/2009 | Spencer .................. B60J 7/104 24/455 |
| 7,654,598 B2 | 2/2010 | Leitner et al. |
| 7,654,599 B2 | 2/2010 | Stewart et al. |
| 7,681,935 B2 | 3/2010 | Leitner et al. |
| D627,703 S | 11/2010 | McLaughlin |
| 7,823,957 B2 | 11/2010 | Williamson |
| 7,841,638 B2 | 11/2010 | Smith |
| 7,845,887 B2 | 12/2010 | Smith |
| 7,857,371 B2 | 12/2010 | Leitner |
| 7,878,568 B2 | 2/2011 | Wu |
| 7,900,990 B2 | 3/2011 | Townson |
| 7,905,536 B2 | 3/2011 | Yue |
| 7,905,539 B2 | 3/2011 | De Carli |
| 7,959,203 B2 | 6/2011 | Smith |
| 8,020,737 B2 | 9/2011 | Sweeney |
| 8,020,912 B2 | 9/2011 | Lounds |
| 8,146,982 B2 | 4/2012 | Williamson et al. |
| 8,297,677 B2 | 10/2012 | Leitner et al. |
| 8,366,173 B2 | 2/2013 | Xu |
| 8,474,896 B2 | 7/2013 | Ostberg |
| 8,480,154 B2 | 7/2013 | Yue |
| 8,511,736 B2 | 8/2013 | Williamson et al. |
| 8,672,388 B2 | 3/2014 | Rusher |
| 8,678,459 B1 | 3/2014 | Win |
| 8,727,415 B2 | 5/2014 | Smith |
| 8,807,625 B2 | 8/2014 | Garska |
| 9,346,344 B2 | 5/2016 | Smith et al. |
| 9,352,790 B2 | 5/2016 | Smith |
| 9,487,071 B1 | 11/2016 | Yue |
| 9,827,838 B2 | 11/2017 | Hannan et al. |
| 9,827,839 B2 | 11/2017 | Williamson et al. |
| 9,834,076 B2 | 12/2017 | Rohr et al. |
| 9,834,259 B2 | 12/2017 | Smith |
| 9,840,135 B2 | 12/2017 | Rusher et al. |
| 9,840,136 B2 | 12/2017 | Smith et al. |
| 10,081,235 B2 | 9/2018 | Freitas et al. |
| 10,086,746 B2 | 10/2018 | Loew et al. |
| 10,093,159 B1 | 10/2018 | Zichettello et al. |
| 10,094,159 B2 | 10/2018 | Grudzinski et al. |
| 10,099,544 B2 | 10/2018 | Battiato |
| 10,106,022 B2 | 10/2018 | Xu |
| 10,106,089 B2 | 10/2018 | Herman |
| 10,112,465 B2 | 10/2018 | Flocco |
| 10,137,766 B2 | 11/2018 | Bernardo et al. |
| 10,144,276 B2 | 12/2018 | Facchinello et al. |
| 10,166,849 B2 | 1/2019 | Facchinello et al. |
| 10,232,691 B1* | 3/2019 | Weng .................. B60J 7/198 |
| 10,308,101 B2 | 6/2019 | Kim et al. |
| 10,328,778 B2 | 6/2019 | Aubrey et al. |
| 2002/0000732 A1 | 1/2002 | Sanders |
| 2002/0096268 A1* | 7/2002 | Schmeichel .............. B60P 7/04 160/328 |
| 2002/0180235 A1* | 12/2002 | Wheatley .................. B60J 7/102 296/100.16 |
| 2003/0057726 A1* | 3/2003 | Wheatley .................. B60J 7/102 296/100.18 |
| 2004/0080174 A1 | 4/2004 | Buelna |
| 2004/0124658 A1* | 7/2004 | Wheatley .................. B60J 7/102 296/98 |
| 2004/0134953 A1 | 7/2004 | Perez |
| 2005/0077747 A1 | 4/2005 | De Gaillard et al. |
| 2006/0091170 A1 | 5/2006 | Almhil |
| 2006/0091171 A1 | 5/2006 | Wardell et al. |
| 2006/0208524 A1 | 9/2006 | Brown et al. |
| 2006/0263163 A1 | 11/2006 | Harberts et al. |
| 2006/0267370 A1* | 11/2006 | Wheatley .................. B60J 7/141 296/100.15 |
| 2006/0283900 A1 | 12/2006 | Stapleton |
| 2007/0063529 A1* | 3/2007 | Weldy .................. B60J 7/08 296/100.07 |
| 2007/0108792 A1* | 5/2007 | Weldy .................. B60J 7/198 296/100.09 |
| 2007/0170739 A1 | 7/2007 | Sims |
| 2007/0262602 A1 | 11/2007 | Nagle |
| 2008/0101883 A1 | 5/2008 | Derecktor |
| 2008/0129077 A1 | 6/2008 | Weldy |
| 2008/0179911 A1* | 7/2008 | Spencer .................. B60J 7/085 296/100.17 |
| 2009/0020576 A1 | 1/2009 | Gale |
| 2009/0146449 A1* | 6/2009 | Steffens .................. B60J 7/141 296/100.07 |
| 2009/0274531 A1* | 11/2009 | Townson .............. B60P 7/0815 410/104 |
| 2010/0270824 A1* | 10/2010 | Yue .................. B60J 7/198 296/100.07 |
| 2010/0283280 A1 | 11/2010 | Kohlstrand et al. |
| 2011/0175387 A1 | 7/2011 | Smith |
| 2012/0274091 A1* | 11/2012 | Yue .................. B60J 7/141 296/100.04 |
| 2012/0274092 A1* | 11/2012 | Yue .................. B60J 7/141 296/100.07 |
| 2012/0274093 A1* | 11/2012 | Yue .................. B60J 7/102 296/100.16 |
| 2012/0319423 A1 | 12/2012 | Smith |
| 2013/0119693 A1 | 5/2013 | Leitner et al. |
| 2015/0001877 A1* | 1/2015 | Fink .................. B60P 7/02 296/100.17 |
| 2015/0054300 A1 | 2/2015 | Shi et al. |
| 2015/0061315 A1* | 3/2015 | Facchinello .............. B60P 7/02 296/100.07 |
| 2015/0102077 A1* | 4/2015 | Martin .................. B60R 9/00 224/405 |
| 2016/0039274 A1* | 2/2016 | Smith .................. B60P 7/02 296/100.02 |
| 2016/0263974 A1* | 9/2016 | Xu .................. B60J 7/067 |
| 2016/0355078 A1* | 12/2016 | Williamson .............. B60J 7/198 |
| 2017/0066311 A1* | 3/2017 | Facchinello .............. B60J 7/141 |
| 2017/0144520 A1* | 5/2017 | Hemphill .............. B60P 7/0807 |
| 2017/0197498 A1* | 7/2017 | Facchinello .............. B60J 7/106 |
| 2017/0326956 A1 | 11/2017 | Marshall |
| 2017/0341494 A1 | 11/2017 | Hannan et al. |
| 2017/0349081 A1 | 12/2017 | Yilma et al. |
| 2017/0355251 A1 | 12/2017 | Rossi |
| 2017/0361755 A1 | 12/2017 | Yilma et al. |
| 2018/0236857 A1 | 8/2018 | Smith |
| 2018/0272930 A1 | 9/2018 | Dylewski et al. |
| 2018/0281572 A1 | 10/2018 | Zichettello et al. |
| 2018/0281573 A1 | 10/2018 | Zichettello et al. |
| 2018/0281574 A1 | 10/2018 | Zichettello et al. |
| 2018/0281575 A1 | 10/2018 | Singer |
| 2018/0281576 A1 | 10/2018 | Zichettello et al. |
| 2018/0290527 A1 | 10/2018 | Marchlewski et al. |
| 2018/0290529 A1 | 10/2018 | Ching |
| 2018/0297456 A1 | 10/2018 | Stickles et al. |
| 2018/0339578 A1 | 11/2018 | Sullivan |
| 2018/0339581 A1 | 11/2018 | Rossi et al. |
| 2018/0339658 A1 | 11/2018 | Frederick et al. |
| 2018/0345768 A1 | 12/2018 | Frederick et al. |
| 2018/0345769 A1 | 12/2018 | Dylewski et al. |
| 2019/0105970 A1 | 4/2019 | Bernardo |
| 2019/0118629 A1* | 4/2019 | Spencer .................. B60J 7/198 |
| 2019/0168590 A1 | 6/2019 | O—Reilly |
| 2019/0291553 A1* | 9/2019 | Ma .................. B60J 7/141 |
| 2020/0056639 A1* | 2/2020 | Voegele .................. B60J 7/198 |
| 2020/0094660 A1* | 3/2020 | Ma .................. B60J 7/185 |

(56) References Cited

U.S. PATENT DOCUMENTS

| | | | |
|---|---|---|---|
| 2020/0108702 A1* | 4/2020 | Dylweski, II | B60J 7/141 |
| 2020/0148046 A1* | 5/2020 | Ma | B60J 7/198 |

FOREIGN PATENT DOCUMENTS

| | | |
|---|---|---|
| CN | 106564417 B | 5/2019 |
| DE | 2 729 235 A1 | 1/1979 |
| FR | 2 781 249 A1 | 1/2000 |
| SU | 0629098 A1 | 10/1978 |
| WO | WO 1994/01298 | 1/1994 |
| WO | WO 2016/022164 | 2/2016 |

OTHER PUBLICATIONS

Roll-N-Lock 2015 Catalog for M-Series and A-series retractable truck bed covers.http://rollnlock.com/wp-content/uploads/2015/03/RNL_Catalog_2015_WEB.pdf.

German Office Action re DE Application No. 10 2015 107 114.2, dated Nov. 19, 2018.

Great Britain Office Action re GB Application No. GB1507802.5, dated May 28, 2015.

* cited by examiner

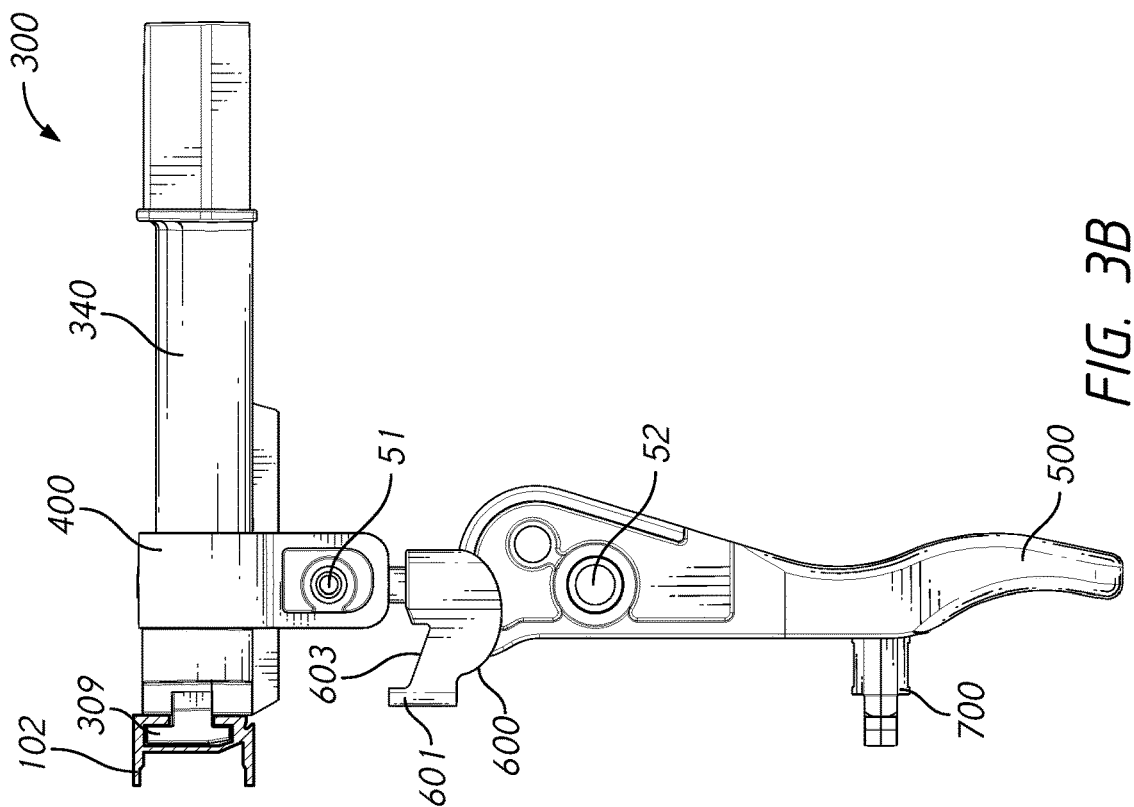
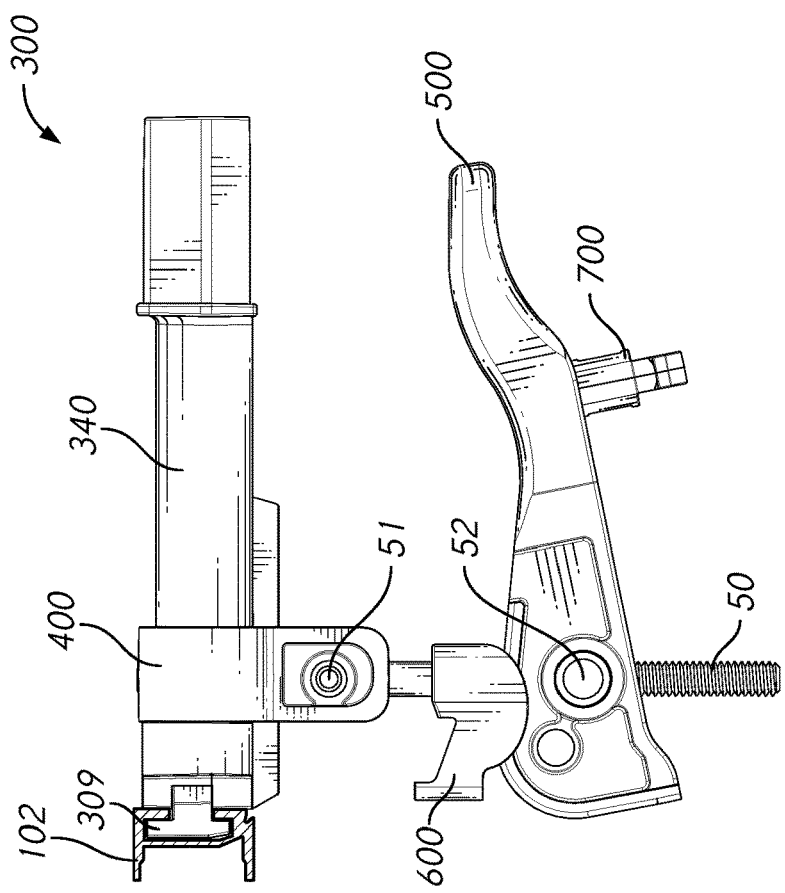
FIG. 3B
FIG. 3A

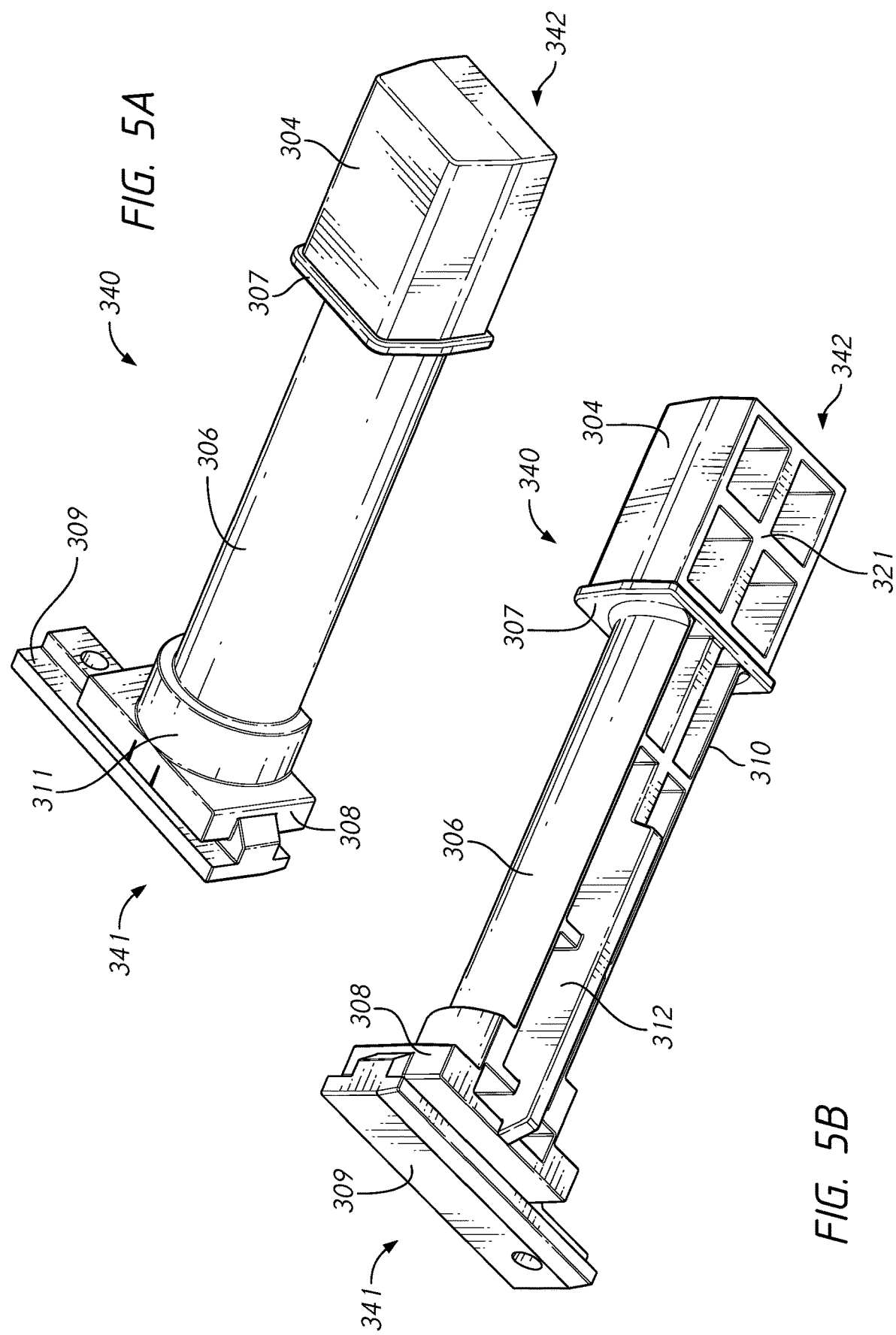

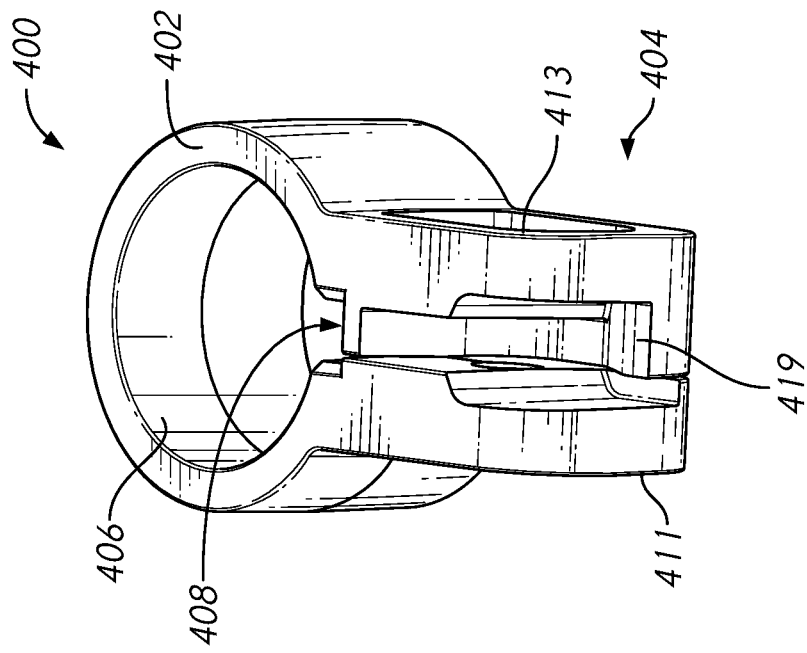
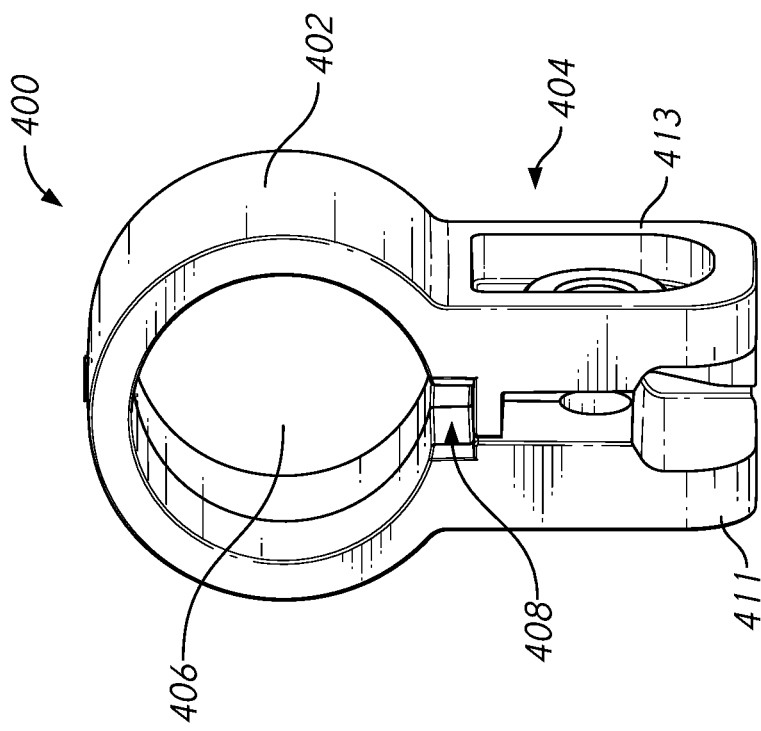

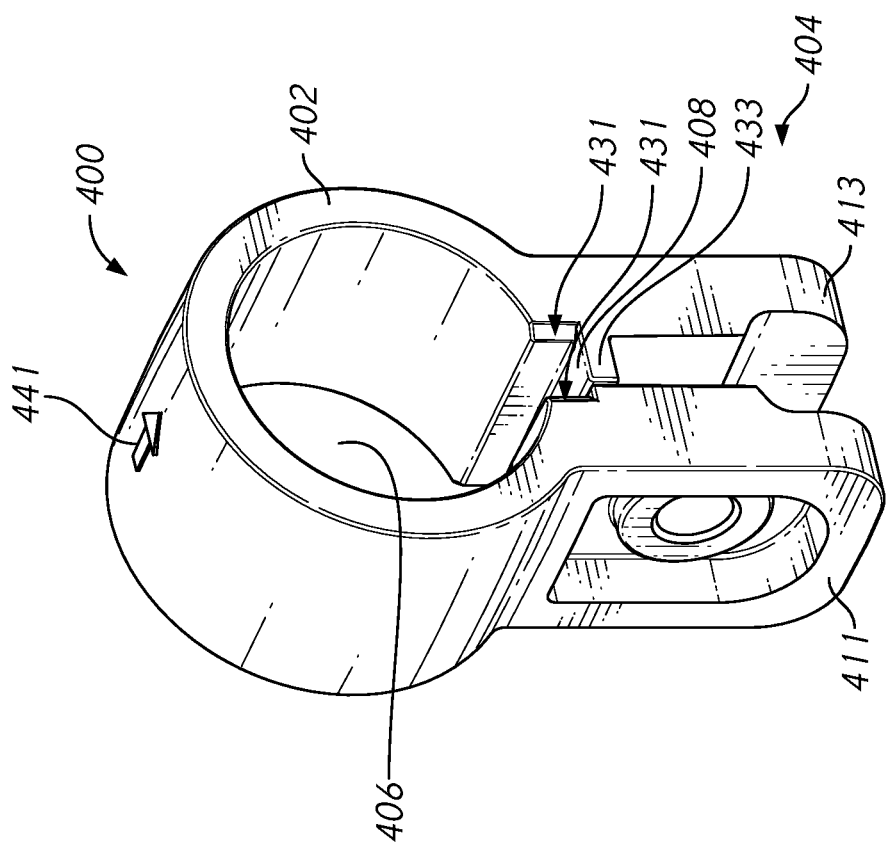
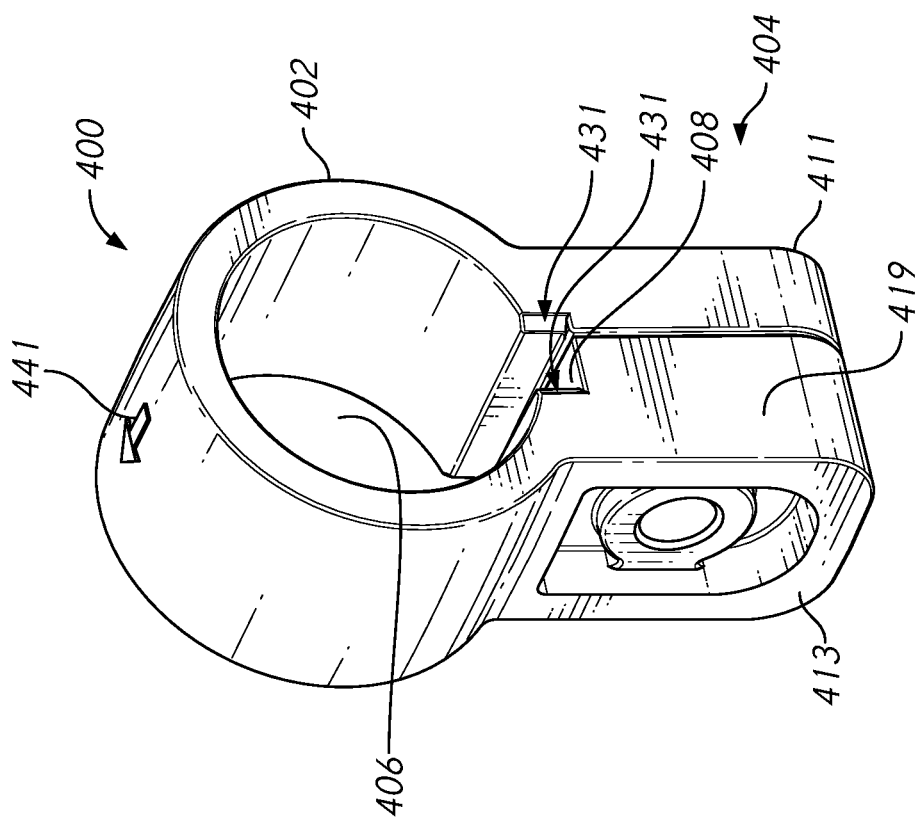

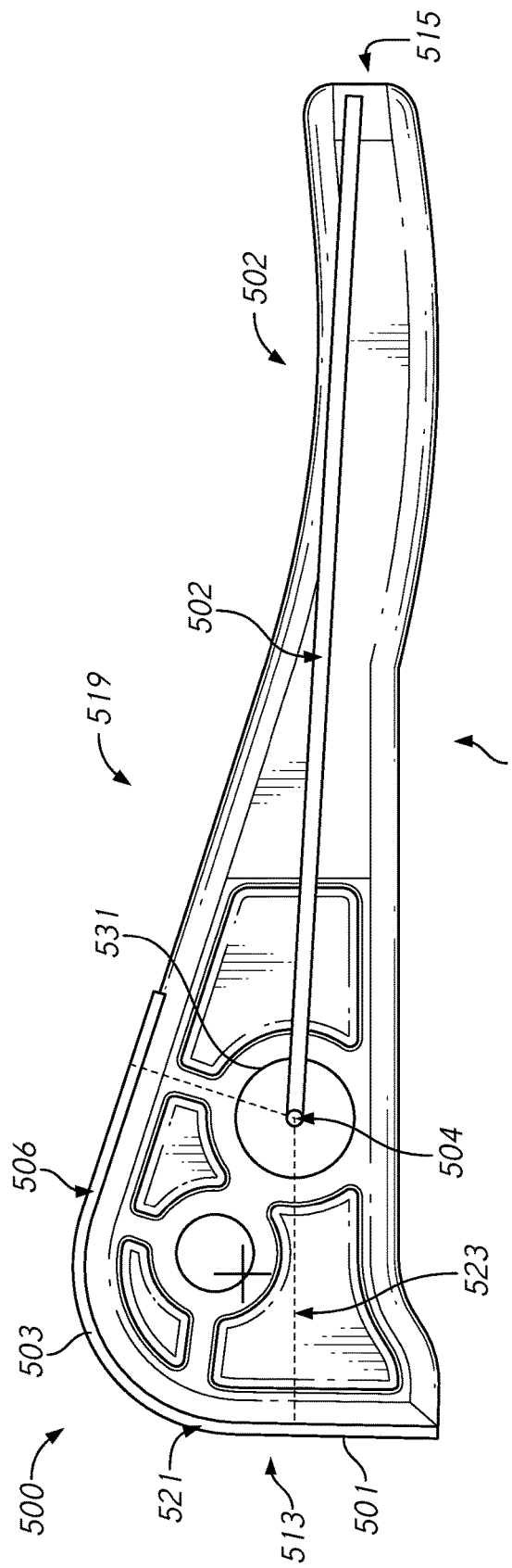
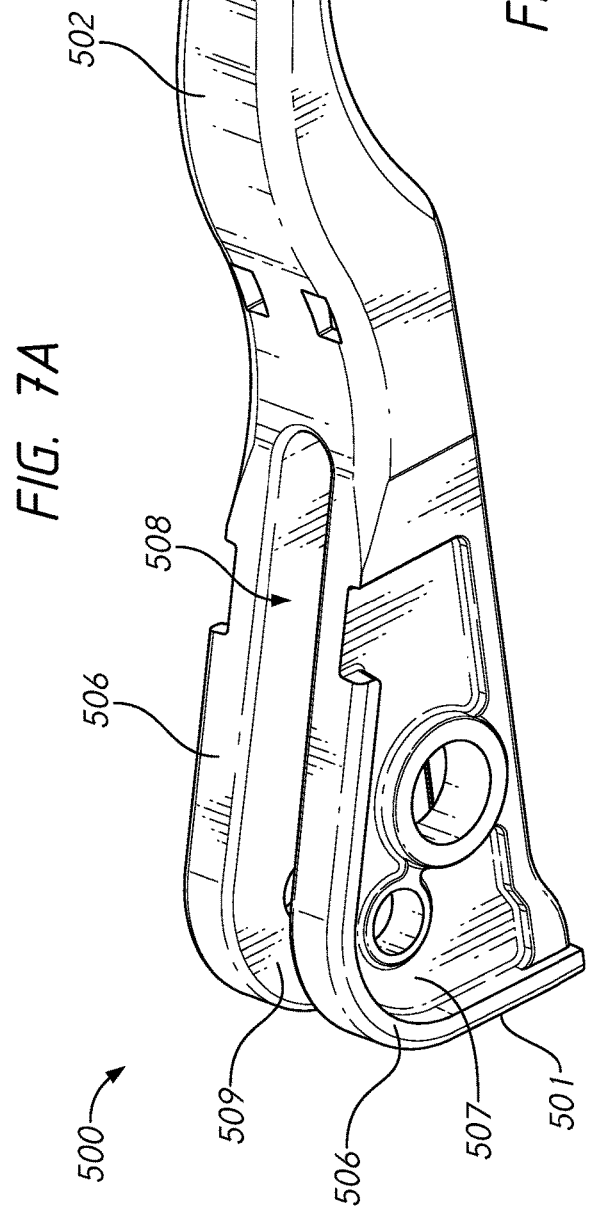
FIG. 7A
FIG. 7B

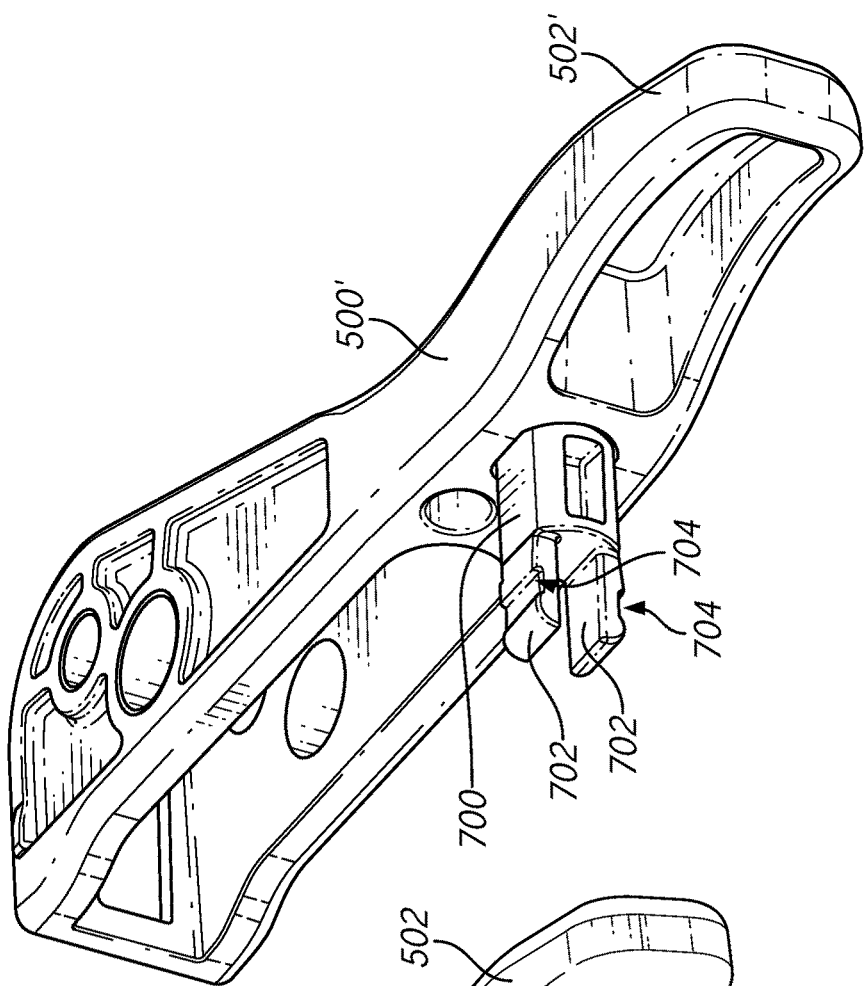
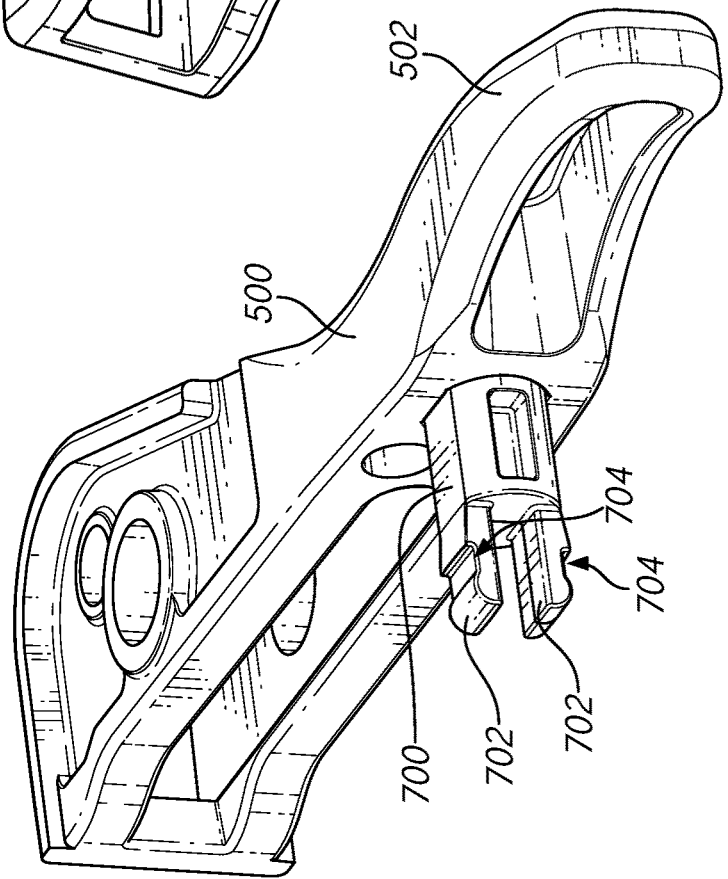
FIG. 10B
FIG. 10A

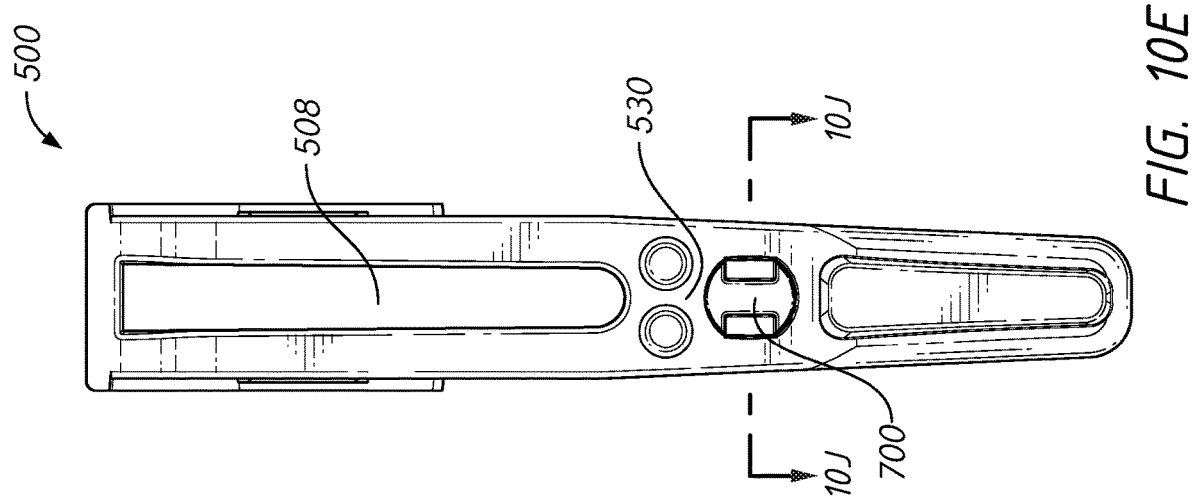
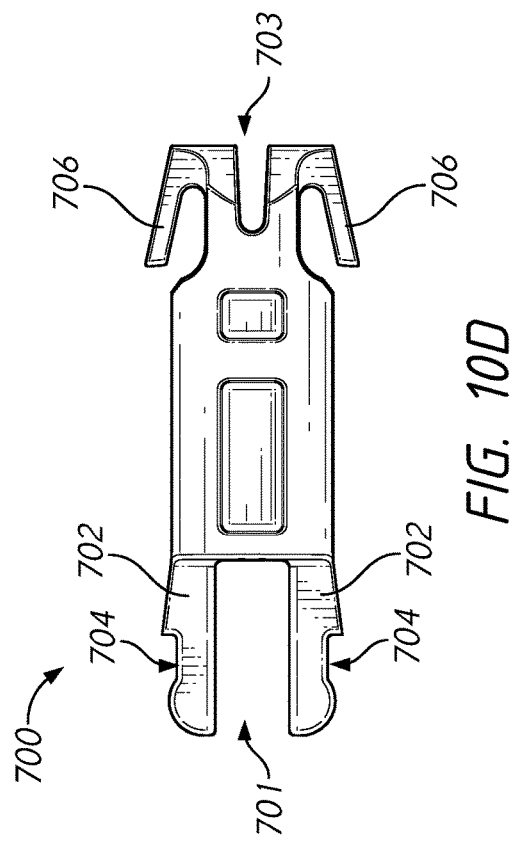
FIG. 10E
FIG. 10D

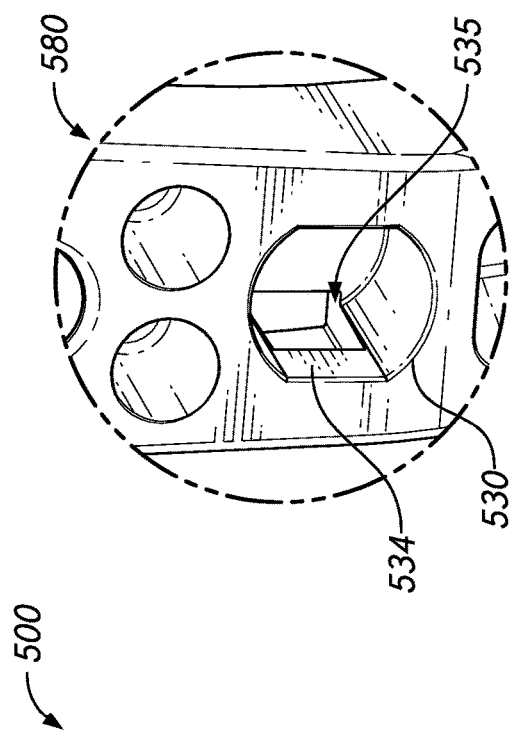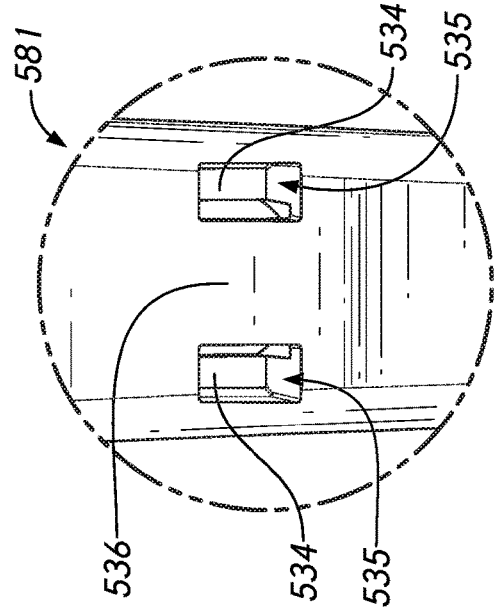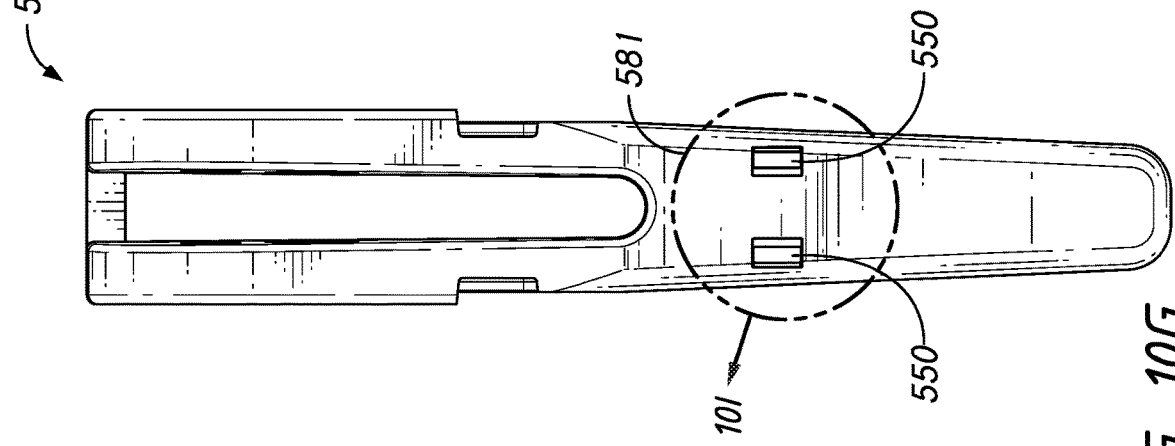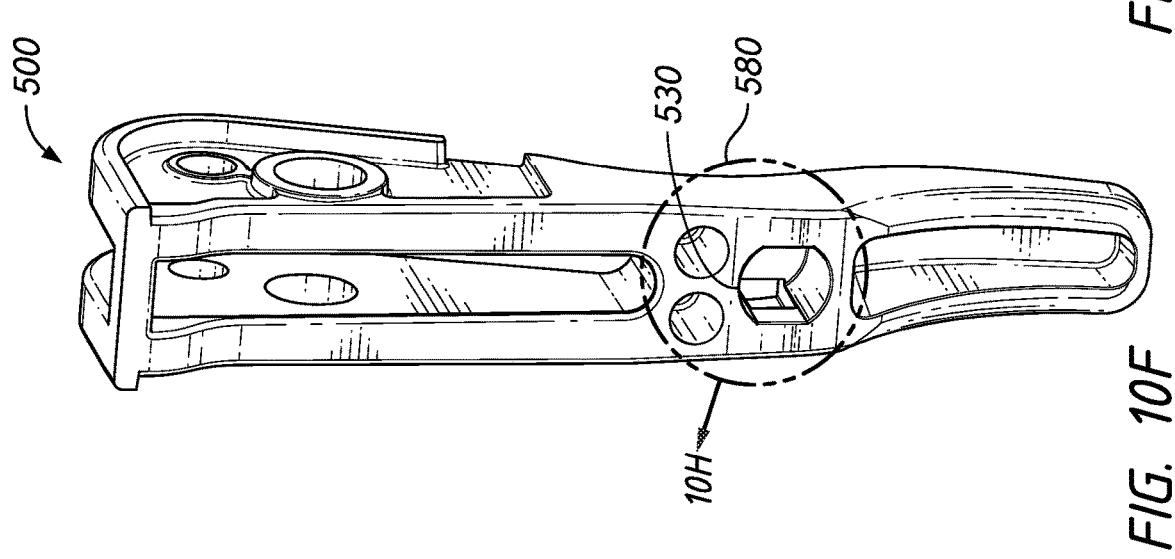

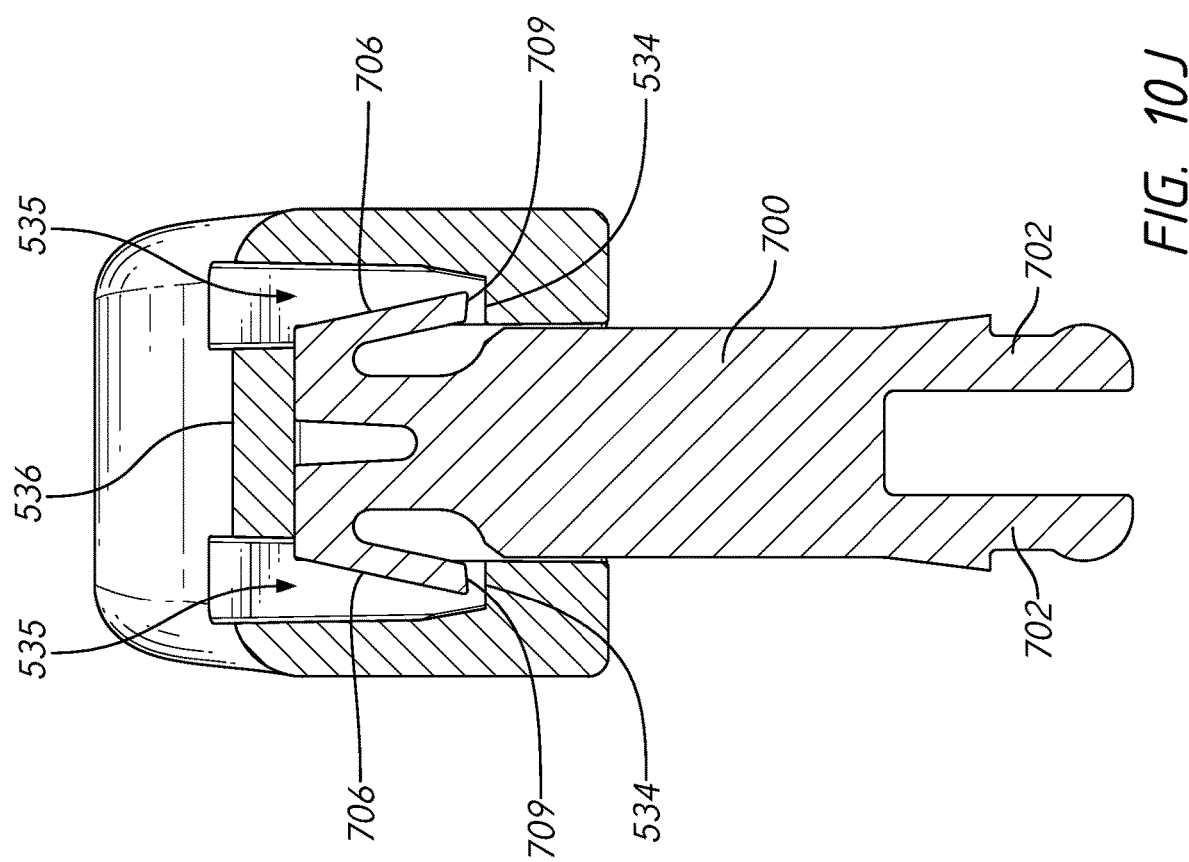

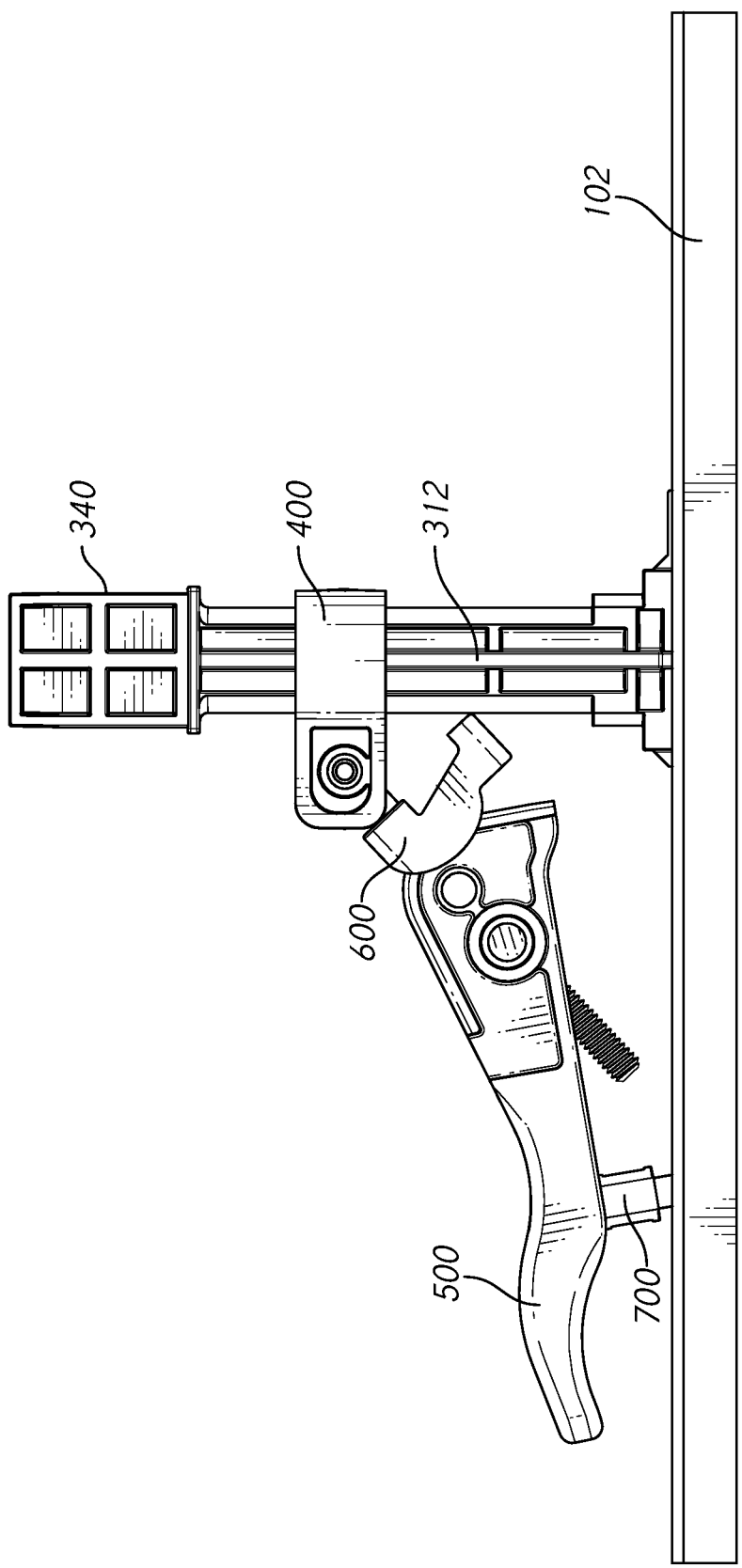

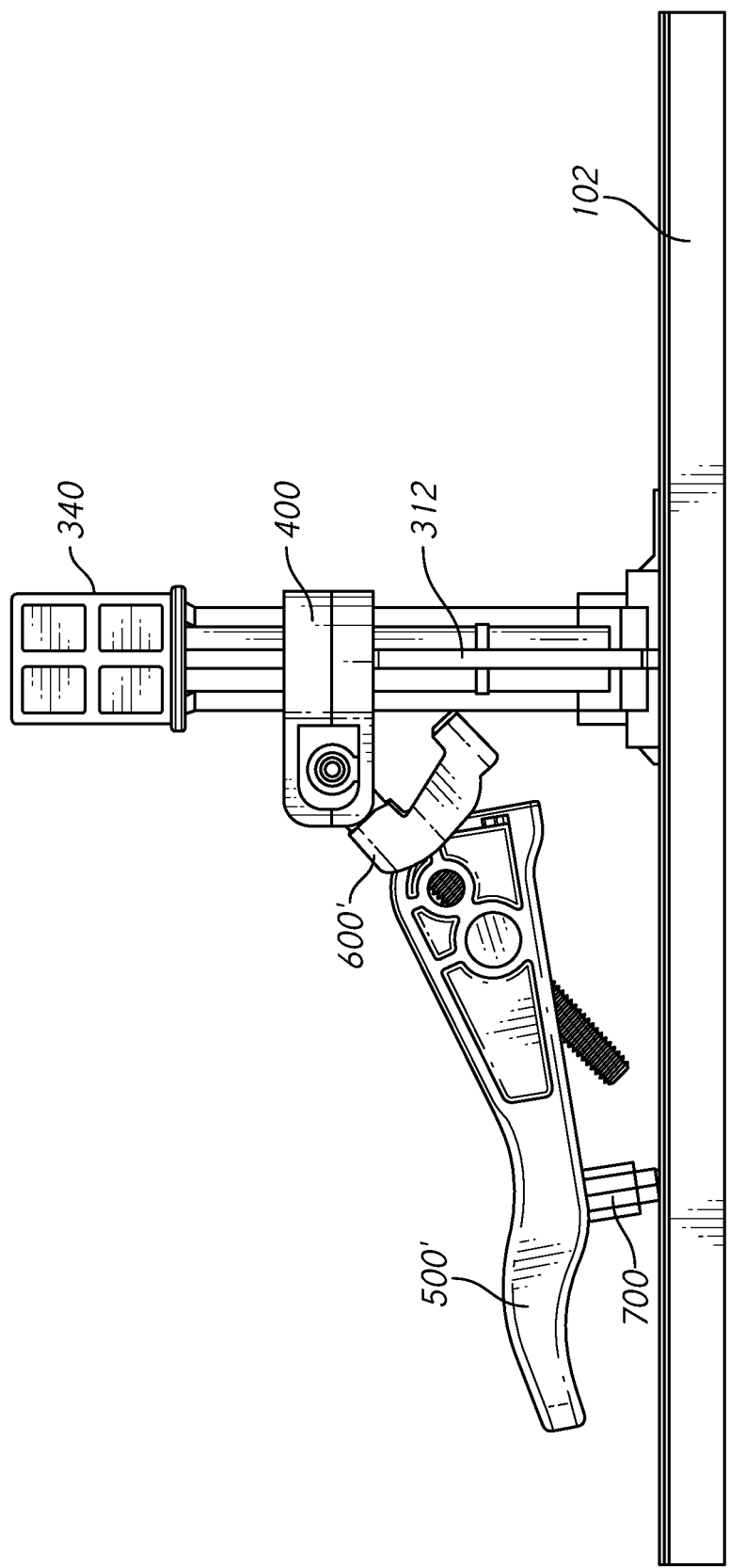

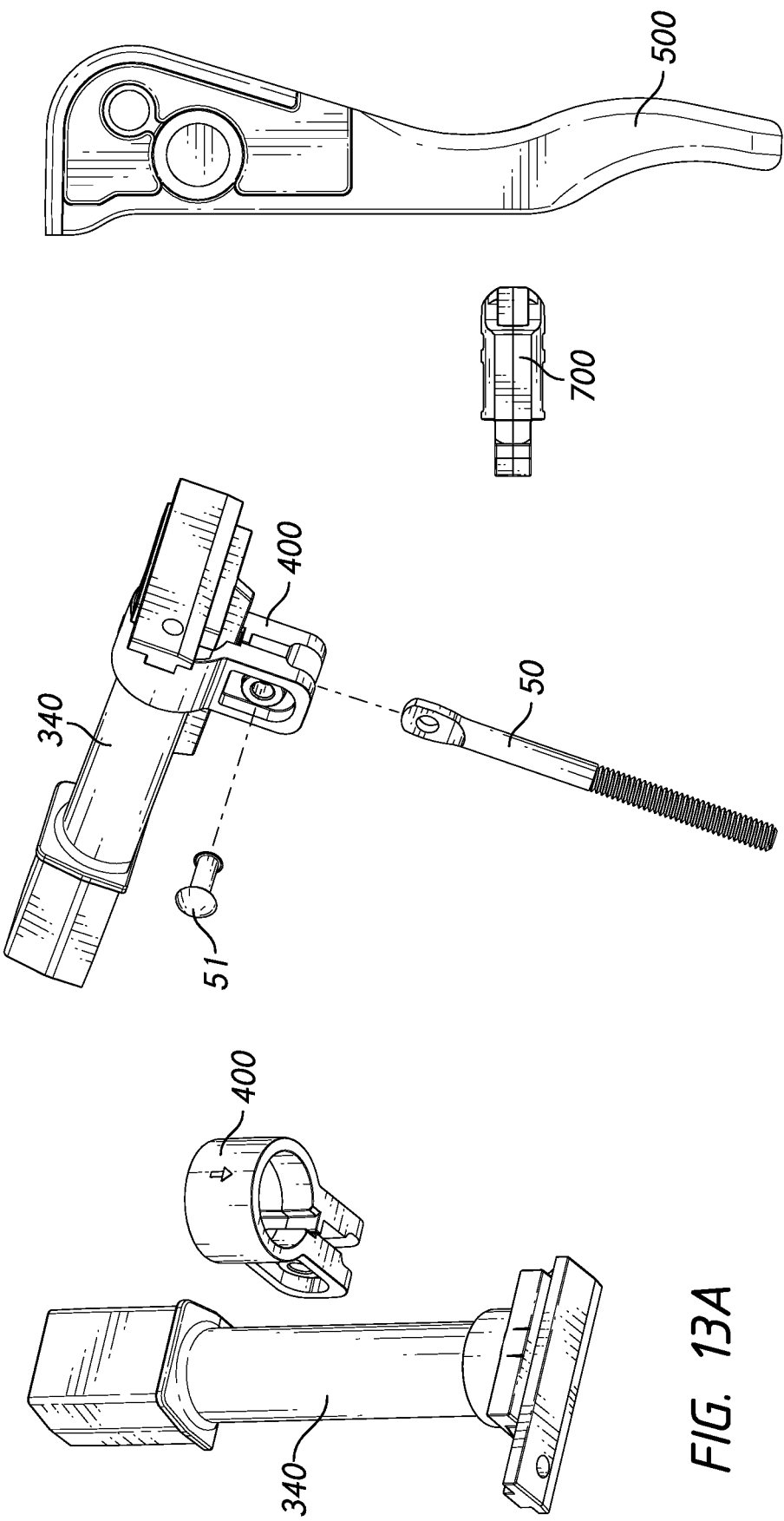

CLAMP ASSEMBLY FOR TONNEAU COVER

INCORPORATION BY REFERENCE TO ANY PRIORITY APPLICATIONS

This application claims priority to U.S. Provisional Application No. 62/702,059, filed Jul. 23, 2018, titled LATCH FOR TONNEAU COVER and U.S. Provisional Application No. 62/658,031, filed Apr. 16, 2018, titled LATCH FOR TONNEAU COVER. The entire contents of the above-identified provisional applications are hereby incorporated by reference herein.

BACKGROUND

Field

Embodiments of the disclosure relate to clamp assemblies for a tonneau cover that can be used to connect the tonneau cover to a vehicle.

Description of the Related Art

A number of tonneau cover latches and clamp assemblies have been used in the art, such as disclosed in U.S. Pat. Nos. 309,767, 7,823,957, and 7,334,830. However, current latches and clamp assemblies suffer various drawbacks. Thus, there is a need for improved clamp assemblies and components thereof.

SUMMARY

The systems, methods, and devices of this disclosure each have several innovative aspects, no single one of which is solely responsible for the desirable attributes disclosed herein.

Disclosed herein is a tonneau cover configured to cover at least a portion of a truck bed of a vehicle. The tonneau cover can comprise: a cover; a frame configured to provide vertical support for the cover, the frame comprising a pair of side rails configured to extend along top surfaces of side walls of the truck bed of the vehicle, the frame further comprising a plurality of bows configured to extend across the truck bed and between the pair of side rails; and a clamp assembly configured to secure the frame to the side walls of the truck bed. The clamp assembly can comprise: a bow hanger comprising a first end, a second end opposite the first end, a main body extending between the first and second ends, and a protrusion extending away from the main body and along a portion of a length of the main body, wherein the first end is configured to secure to one of the pair of side rails and the second end is configured to secure to an end of one of the plurality of bows; a bow slide comprising: a head having an aperture, the head configured to surround and move along the length of the main body of the bow hanger; and a slot configured to receive the protrusion of the bow hanger and prevent rotation of the bow slide with respect to the bow hanger; a hanger bolt secured to a portion of the bow slide; a cam follower having an opening sized to receive the hanger bolt, the cam follower comprising at least one retainer and a latch; and a handle configured to secure to a portion of the hanger bolt, the handle comprising at least one ridge extending from a surface of the handle, the at least one ridge configured to engage the at least one retainer of the cam follower, wherein rotation of the handle causes the cam follower to move between a clamped position and an unclamped position, and wherein, in the clamped position, the latch of cam follower is positioned closer to the bow slide than in the unclamped position.

In some embodiments, the main body of the bow hanger comprises a partially circular cross section. In some embodiments, the cross section of the main body of the bow hanger comprises a circular portion and a flat portion, and wherein the protrusion extends from the flat portion of the cross section of the main body.

In some embodiments, the bow slide further comprises a body portion connected to the head, the body portion comprising a first arm and a second arm, the first and second arms being movable with respect to one another such that the bow slide can be removably attached around the bow hanger.

In some embodiments, the bow hanger comprises a tail portion at the second end and integral with the main body, the tail portion having a larger cross section than a cross section of the main body.

In some embodiments, the head of the bow slide is configured to be at least partially circumferentially rotatable around a portion of the main body of the bow hanger that does not comprise the protrusion.

In some embodiments, the at least one ridge of the handle extends from an interior surface of the handle. In some embodiments, the cam follower comprises a stem extending from a bottom surface of the cam follower, the stem configured to fit at least partially within a slot in the handle, and wherein the at least one retainer extends outwardly from the stem towards the interior surface of the handle and engages the at least one ridge of the handle.

In some embodiments, the handle comprises: a first end and a second end opposite the first end, the first end configured to contact the cam follower when the clamp assembly is in use; a first side extending between the first and second ends and configured to face the side walls of the truck bed when the clamp assembly is in use and a second side opposite the first side; and a hook support extending away from the first side at the first end, the hook support configured to reduce a cantilever force on the first end of the handle when in use.

In some embodiments, the tonneau cover further comprises a gripper. In some embodiments, the gripper is integral with the handle. In some embodiments, the gripper comprises a stow clip having a first end and a second end opposite the first end, wherein the first end is configured to secure to a portion of the handle and the second end is configured to secure to a portion of the side rail, and wherein the stow clip is configured to stay secured to the handle after disengagement of the clip with the side rail.

In some embodiments, the first end comprises at least one arm configured to secure within at least one slot extending through a width of the handle, and wherein the second end comprises at least one arm configured to secure within a portion of the side rail.

In some embodiments, the slot of the bow slide is proximate the aperture of the head of the bow slide.

In some embodiments, the aperture of the head is circular and the slot is non-circular.

In some embodiments, the protrusion extends away from a bottom surface of the main body, the bottom surface facing a floor of the truck bed when the clamp assembly is in an installed position.

In some embodiments, the cam follower comprises two retainers and the handle comprises two ridges.

Disclosed herein is a clamp assembly configured to secure a tonneau cover to a vehicle. The clamp assembly can comprise: a bow hanger comprising a first end, a second end opposite the first end, a main body extending between the first and second ends, and a protrusion extending away from the main body and along a portion of a length of the main body; a bow slide comprising: a head having an aperture, the head configured to surround and move along the length of the main body of the bow hanger; and a slot configured to receive the protrusion of the bow hanger; and a handle coupled to the bow slide, wherein engagement between the protrusion of the bow hanger and the slot of the bow slide prevents the handle and bow slide from rotating around the bow hanger.

In some embodiments, the protrusion extends away from a bottom surface of the main body toward a floor of a truck bed when the clamp assembly is in an installed position on a vehicle.

In some embodiments, the bow slide further comprises a body having two arms, the two arms of the body configured to be at least partially separated from each other.

Disclosed herein is a clamp assembly configured to secure a tonneau cover to a vehicle, the clamp assembly comprising: a bow hanger comprising a first end and a second end opposite the first end; a bow slide configured to move along at least a portion of the bow hanger between the first and second ends of the bow hanger; a hanger bolt configured to secure to a portion of the bow slide; a handle configured to secure to a portion of the hanger bolt, the handle comprising at least one ridge extending from an interior surface of the handle; and a cam follower having an opening sized to receive the hanger bolt, the cam follower comprising a latch and a stem, the stem configured to fit at least partially within a slot in the handle, wherein the stem comprises at least one retainer extending outwardly from the stem towards the interior surface of the handle, the at least one retainer configured to engage the at least one ridge of the handle. Rotation of the handle with respect to the hanger bolt can cause the cam follower to move between a first position and a second position, and wherein, in the first position, the latch of cam follower can be positioned closer to the bow slide than in the second position.

In some embodiments, the stem of the cam follower comprises two retainers extending from the stem in opposite directions, and wherein the handle comprises two ridges extending from two interior surfaces of the handle, the two interior surfaces of the handle facing each other.

In some embodiments, the stem extends from a bottom surface of the cam follower, wherein the bottom surface of the cam follower faces a direction away from a direction that the latch of the cam follower faces.

Disclosed herein is a clamp assembly configured to secure a tonneau cover to a vehicle, the clamp assembly comprising: a bow hanger comprising a first end and a second end opposite the first end; a bow slide configured to move along at least a portion of the bow hanger between the first and second ends of the bow hanger; a hanger bolt configured to secure to a portion of the bow slide; a handle configured to secure to a portion of the hanger bolt, the handle further configured for rotation with respect to the hanger bolt; and a gripper, the gripper comprising a first end and a second end opposite the first end, the first end configured to secure to a portion of the handle and the second end configured to secure to a portion of a side rail of the tonneau cover, wherein the gripper is configured to stay secured to the handle after disengagement of the gripper with the side rail.

In some embodiments, the gripper is integral with the handle.

In some embodiments, the first end of the gripper comprises at least one arm configured to secure within at least one slot extending through a width of the handle, and wherein the second end of the gripper comprises at least one arm configured to secure within a portion of the side rail.

In some embodiments, the at least one arm of the first end of the gripper extends in at least two directions.

Disclosed herein are embodiments of a tonneau cover assembly comprising a bow hanger, the bow hanger configured to connect a bow of a tonneau cover to a sidewall of a vehicle, the bow hanger including a rib extending along a section of the bow hanger and a clamp configured for retaining the assembly onto the vehicle, the clamp comprising a bow slide configured to slide along bow hanger, the bow slide comprising a head having an aperture, the head configured to circumferentially surround the bow hanger and slide along the bow hanger, and a keying slot configured to mate with the rib, wherein the bow slide is prevented from rotating when the keying slot is mated with the rib, and a hanger bolt rotatably received within the bow slide, a cam follower interfacing with the hanger bolt, the cam follower including a pair of retainers and a latch, and a handle interfacing with the hanger bolt and the cam follower, the handle including a pair of rails configured to mate with the pair of retainers of the cam follower, wherein rotation of the handle causes the cam follower to move between an open and a closed position, wherein the latch clamps to the side rail in the closed position, and a stow clip extending from the handle, the stow clip configured to mate with the side rail.

In some embodiments, the clamp can further comprise a body extending from the head, the body being openable to release the bow slide from the bow hanger extension. In some embodiments, the head can be configured to circumferentially rotate around the bow hanger.

Also disclosed herein are embodiments of a tonneau clamp for attaching a tonneau cover to a vehicle, the clamp comprising a bow slide having a head with an aperture, a bolt rotatably received within the body, a cam follower interfacing with the bolt, the cam follower including a pair of retainers and a latch, and a handle interfacing with the bolt and the cam follower, the handle including a pair of rails configured to mate with the pair of retainers of the cam follower, wherein rotation of the handle causes the cam follower to move between an open and a closed position, wherein the latch clamps to the side rail in the closed position, and a stow clip extending from the handle, the stow clip configured to mate with the side rail.

In some embodiments, the pair of retainers can extend towards a center of the cam follower. In some embodiments, the pair of retainers can extend toward an outer edge of the cam follower. In some embodiments, the bow slide can further comprise an openable body.

Further disclosed herein are embodiments of a tonneau clamp for attaching a tonneau cover to a vehicle, the clamp comprising a cam follower, the cam follower having a latch on an upper surface and a tab extending away from the cam follower on a lower surface, the tab including a pair of retainers located on opposite sides of the tab and extending towards an outer width of the cam follower, and a handle interfacing with the cam follower, the handle including an inner channel and a pair of rails located on an inner surface of the inner channel and configured to mate with the pair of retainers of the cam follower, wherein rotation of the handle causes the cam follower to move between an open and a closed position, wherein the latch clamps to the side rail in the closed position.

BRIEF DESCRIPTION OF THE DRAWINGS

FIG. 3A illustrates a side view of a clamp assembly for a tonneau cover in a clamped position in accordance with aspects of this disclosure.

FIG. 3B illustrates a side view of the clamp assembly of FIG. 3A in an unclamped position in accordance with aspects of this disclosure.

FIG. 5A illustrates a top perspective view of the bow hanger of FIG. 4A.

FIG. 5B illustrates a bottom perspective view of the bow hanger of FIG. 4A.

FIG. 6A illustrates a perspective view of the bow slide of FIG. 4A.

FIG. 6B illustrates another perspective view of the bow slide of FIG. 4A.

FIG. 6E illustrates a back perspective view of the bow slide of FIG. 4A.

FIG. 6F illustrates a front perspective view of the bow slide of FIG. 4A.

FIG. 7A illustrates a side view of an embodiment of a handle in accordance with aspects of this disclosure.

FIG. 7B illustrates a perspective view of the embodiment of the handle of FIG. 7A.

FIG. 10A illustrates a perspective view of an embodiment of a handle and a stow clip in accordance with aspects of this disclosure.

FIG. 10B illustrates a perspective view of another embodiment of a handle and a stow clip in accordance with aspects of this disclosure.

FIG. 10D illustrates a side view of the stow clip of FIG. 10C.

FIG. 10E illustrates a front view of the handle and stow clip of FIG. 10A.

FIG. 10F illustrates a perspective view of the handle of FIG. 10A.

FIG. 10G illustrates a back view of the handle of FIG. 10A.

FIG. 10H illustrates an enlarged view of a portion of the handle shown in FIG. 10F.

FIG. 10I illustrates an enlarged view of a portion of the handle shown in FIG. 10G.

FIG. 10J illustrates a cross section taken along line A-A shown in FIG. 10E.

FIG. 11A illustrates a bottom view of an embodiment of a clamp assembly secured to a portion of a side rail in accordance with aspects of this disclosure.

FIG. 11B illustrates a bottom view of an embodiment of a clamp assembly secured to a portion of a side rail in accordance with aspects of this disclosure.

FIGS. 13A-13E illustrate a method of assembling a clamp assembly in accordance with aspects of this disclosure.

DETAILED DESCRIPTION

Figure 1:
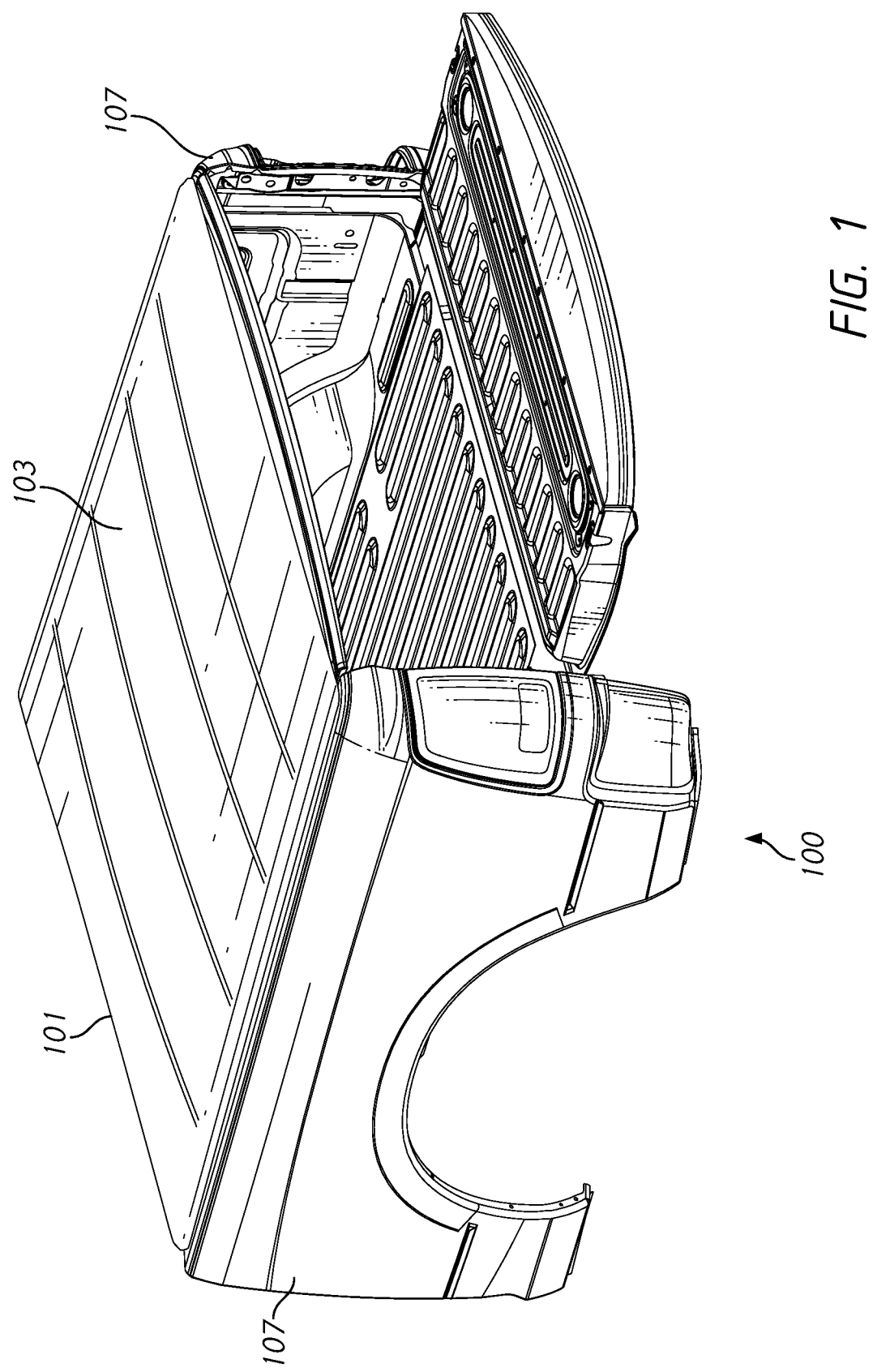
FIG. 1 illustrates a truck bed having and a tonneau cover in accordance with aspects of this disclosure.

Disclosed herein are embodiments of a clamp assembly configured to mount a tonneau cover to sidewalls of a vehicle such as a truck. In some embodiments, the covers can be tonneau covers, as discussed in more detail below, but the type of cover does not limit the disclosure.

In some embodiments, the clamp assembly includes bow hangers which can be used to attach a tonneau cover, tonneau, or portion thereof, to a bed of a pickup truck. The tonneau cover can include a top portion (also referred to herein as "cover" or "top") that can be hard or soft, or a mixture of hard portions and soft portions. The relative rigidity of the cover does not limit the disclosure. The tonneau cover can include a frame having one or more side rails and/or one or more structural members (referred to herein as "bows") which can span across a truck bed of a vehicle. For example, the frame can include two side rails configured to sit atop, contact, and/or secure to top surfaces of sidewalls of the truck bed, a side rail configured to sit atop, contact, and/or secure to a top surface of a front wall of the truck bed, and/or a side rail configured to sit atop, contact, and/or secure to a top surface of a rear tailgate of the truck bed. The cover of the tonneau can extend over all or a portion of the frame of the tonneau cover. In some embodiments, the tonneau cover can be reduced in size (such as into a storage position) by folding (and/or hinging for a hard cover), and rolling (for example, for a soft cover), though the method of reduction does not limit the disclosure. Therefore, the tonneau cover can extend over the length of the truck bed or can be compacted into a storage position, thereby revealing the contents of the truck bed for a user to more easily access. Because the tonneau cover can completely cover a truck bed, the tonneau cover can be used, for example, to prevent sun or other environmental damage to cargo. Further, in some embodiments the tonneau cover can be locked onto the truck bed, such as on the gate of the truck bed, thereby increasing security of any cargo by preventing others from accessing a truck bed that is typically open without the tonneau cover.

In some embodiments, the clamp assembly has a reduced amount of parts compared to clamp assemblies in the prior art, which can reduce manufacturing and assembly time, weight of the assembly, and costs. For example, the assembly may include the following pre-assembled parts, each of which is discussed further herein: a bow slide 400 with hanger bolt 50 and fastener 52; a bow hanger 340; a handle 500/500' with a stow clip 700; and a cam follower 600/600'. Thus, the total number of pre-assembled parts can equal four in some embodiments of the clamp assembly 300.

Figure 2:
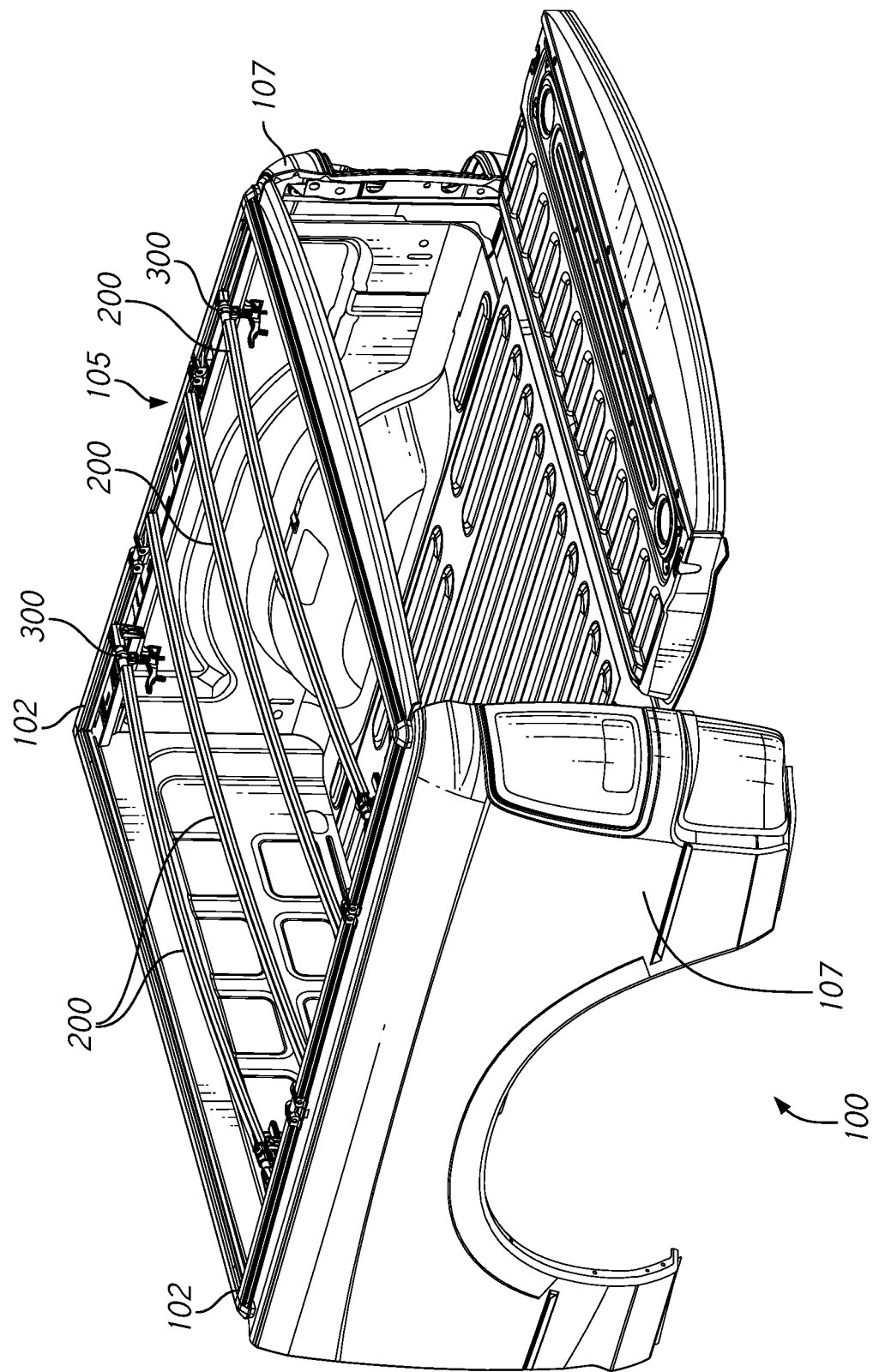
FIG. 2 illustrates the tonneau cover of FIG. 1 with a top portion removed to illustrate a frame of the tonneau cover.

FIG. 1 illustrates a truck bed 100 of a vehicle which can be covered with a tonneau cover 101. As shown in FIGS. 1-2, the tonneau cover 101 can include top or cover 103 and a frame 105 which can support the cover 103. The frame 105 can have a series of rails 102 that can be located on and/or can extend along side walls, a front, and/or a rear (tailgate) of the truck bed 100, for example, top surfaces of the side walls 107 of the truck bed 100. FIG. 1 illustrates the tonneau cover 101 with a top 103 (such as a flexible and/or fabric cover) and FIG. 2 illustrates the tonneau cover 101 with no top 103 to better show the frame 105 and components thereof (for example, the rails 102 and bows 200). The rails 102 can be permanently attached to side walls 107 of the truck bed 100 or can be removable from the truck bed 100. In some embodiments, the rails 102 can be a part of or integral with the truck bed 100. As discussed in detail below, the rails 102 can be attached on the truck bed 100 through the use of one or more clamp assemblies such as those discussed herein. In some embodiments, the truck bed 100 can have one or more generally parallel rails 102 along a length of the bed 100. For example, the truck bed 100 can have 2, 3, 4, 5, 6, 7, 8 or more rails 102 and the number of rails 102 does not limit the disclosure. Where the rails 103 are placed atop, contacting, and/or secured to top surfaces of the sidewalls 107, the top surfaces of the sidewalls 107 can be generally flat and can run generally parallel to a bottom of the truck bed 100. As is common in many truck bed 100, the sidewalls 107 can have a downward or partially downward flange which can provide a clamping point, surface, or region for a clamping assembly (or portion thereof) to secure thereto.

As shown in FIG. 2, one or more clamp assemblies 300 can be used to secure the tonneau cover 101 to the truck bed 100. For example, the one or more clamp assemblies 300 can secure to ends of the bows 200, portions of the side rails 102, and/or portions of the sidewalls 107 of the truck bed 100 (for example, portions of downward flanges or lips of the sidewalls 107). The tonneau cover 101 can include a plurality of bows 200 that can extend across the truck bed 100 and secure to portions of the clamp assemblies 300. For example, the tonneau cover can include one, two, three, four, five, six, seven, or eight or more bows 200. In some embodiments, the tonneau cover 101 includes two first side rails 102 configured for placement atop and/or along a opposing sidewalls 107 of the truck bed 100. The tonneau cover 101 can be secured to the truck bed 100 with one, two, three, four, five, six, seven, or eight or more clamp assemblies 300. One of the plurality of bows 200 can be secured to two sidewalls 107 of the truck bed 100 with two clamp assemblies 300 which each secure to one of two ends of the bow 200.

In some embodiments, a plurality of clamp assemblies 300 can be used on the truck bed 100. In some embodiments, one, two, three, four, five, six, seven or eight or more clamp assemblies 300 can be used on each side of the truck bed 100. In some embodiments, greater than one, two, three, four, or five clamp assemblies 300 can be used on each side of the truck bed 100. In some embodiments, less than one, two, three, four, or five clamp assemblies 300 can be used on each side of the truck bed 100. The number of clamp assemblies 300 used does not limit the disclosure. In some embodiments, the same number of clamp assemblies 300 can be used on each side of the truck bed 100. In some embodiments, a different number of clamp assemblies 300 can be used on each side of the truck bed 100. In some embodiments, each clamp assembly 300 can be associated with a portion of the tonneau cover 101. In some embodiments, not every clamp assembly 300 is associated with a portion of the tonneau cover 101.

In some embodiments, the clamp assembly 300 can be movable along the side rail(s) 102 when in an unclamped or open position (see FIG. 3A). When in a clamped or closed position (see FIG. 3B), the clamp assembly 300 can be locked in a stationary position by, for example, movement and/or rotation of a handle 500 of the clamp assembly 300.

As discussed and shown in more detail below, in some embodiments the clamp assemblies 300 (or portions thereof) can be removably associated with and generally retained in the side rails 102 or portions thereof. For example, as shown in at least FIGS. 3A-3B and 5A, the clamp assembly 300 can include a bow hanger 340 having a guide 309 at a first end 341 of the bow hanger 340. The guide 309 can be generally T-shaped in some embodiments and can insert into a channel of a side rail 102 (see FIGS. 3A-3B). The guide 309 can have a stem with a double flange member, though it could be other shapes as well and the shape does not limit the disclosure. When the clamp assembly 300 is in an unclamped or open configuration (for example, not clamped to a portion of the sidewalls 107 of the truck bed 100), the guide 309 can slide within the channel or internal structure of the side rail 102 (see FIGS. 3A-3B and FIG. 9). However, this is merely an example of an attachment mechanism between the clamp assembly 300 and the side rail 102. Other types of attachments can be used as well, and the particular attachment between the clamp assembly 300 and the side rail 102 does not limit the disclosure.

Bows 200 can be located at the edges of segmented sections (for example, panels) found in hard tonneau covers, though soft tonneau covers can be used as well. As mentioned, the bows 200 can be associated with the clamp assemblies 300. The bows 200 can be removably attached to the clamp assembly 300 or a portion thereof. For example, referring to FIGS. 2 and 5A-5B, ends of the bows 200 can secure to an end 342 of the bow hanger 340 of the clamp assembly 300. Advantageously, ends of the bows 200 can secure to an end 342 of the bow hanger 340 without requiring an additional, separate adapter piece that secures to end 342 of the bow hanger 340. For example, the end 342 of the bow hanger 340 can be sized and shaped to secure within or around an end of the bow 200. End 342 can include a tail 304 which is sized and shaped to fit within an end of bow 200. End 342 can also include a rim 307 having a larger cross section that the tail 304 which can help keep the end of the bow 200 from further translating or moving beyond or inward from the tail 304 (for example, moving further along the bow hanger 340 toward the end 341 or main body 306.

With reference to FIG. 2, clamp assembly 300 can be used to attach the side rails 102 to the sidewalls 107 of truck bed 100. As also discussed above, the side rails 102 can be part of a frame 105 of the tonneau cover 101, and the bows 200 can also be part of the frame 105 of the tonneau cover 101. The clamp assembly 300 can attach a top or cover 103 to the side rails 102 by directly engaging and/or securing ends of the bows 200 and by directly engaging a portion of the side rails 102 (for example, with securement of the guide 309 to channels of the side rails 102). As discussed above, FIG. 1 illustrates a truck bed 100 with a cover 103 over the bows 200. As shown, the cover 103 can be associated with the bows 200, thus allowing the cover 103 to provide a covering for the bed 100.

FIGS. 3A-3B illustrate side views of clamp assembly 300 and a side rail 102. FIG. 3A illustrates a side view of clamp assembly 300 when in an unclamped or open position while FIG. 3B illustrates a side view of clam assembly 300 in a clamped or closed/locked position. As shown, clamp assembly 300 can include a bow hanger 340, a bow slide 400, a handle 500, and a cam follower 600. A fastener 51 (such as a rivet or bolt) can secure the bow slide 400 to a portion of a hanger bolt 50, as shown and discussed in more detail below (see also FIGS. 13B and 13E). A fastener 52 (such as a rivet or bolt or a cylinder nut) can secure a portion of the hanger bolt 50 to the handle 500, as shown and discussed in more detail below (see also FIG. 13D-13E and associated description below). As also discussed and shown in more detail herein, the clamp assembly 300 can include a gripper 700 which can be integral with the handle 500 or permanently or removably attached to a portion of the handle 500. The gripper can grip a portion of the side rail 102 to secure the clamp assembly 300 or a portion thereof to the side rail 102. In some embodiments, the gripper is a stow clip 700. Also shown in FIGS. 3A-3B is side rail 102 which can have a channel or internal structure configured to receive a portion of the bow hanger 340 (such as a guide 309 of the bow hanger 340). The cam follower 600 can have a lip 601 (also referred to as a "latch" or "latch portion") and an engagement surface 603 that are configured to contact and/or secure to a portion of the side wall 107 of truck bed 100, such as a downward flange of the side wall 107. As shown, when the clamp assembly 300 is in a clamped position (see FIG. 3B), the handle 500 is oriented generally perpendicular or transverse to an axis running through the bow hanger 340 and the cam follower 600 is positioned closer to the bow hanger 340 and/or bow slide 400 than when the clamp assembly 300 is in an unclamped position (FIG. 3A).

As the handle 500 is rotated from a position where it is perpendicular or transverse to the hanger bolt 50 and partially parallel with the bow hanger 340 (as shown in FIG. 3A) to a position where it is aligned or partially aligned with an axis of the hanger bolt 50 (for example, downwards in the orientation shown in FIG. 3B), the cam follower 600 can be moved upwards towards the bow hanger 340 and/or bow slide 400, thereby allowing the cam follower 600 (or portion thereof such as the lip 601 and/or engagement surface 603) to contact an underside of a side wall 107 of a truck bed 100 and in turn securing the tonneau cover 101 to the vehicle. In some embodiments, the handle 500 can extend away from the bow hanger 340 (or a portion thereof such as the main body 306), thereby providing sufficient room for a user to grip and hold the handle 500. In some embodiments, the handle 500 can have a cushion, or other soft material, attached for a user to hold. In some embodiments, the handle 500 can be sized and shaped to easily fit within a user's hand. For example, the handle 500 can define a recess for receiving a thumb or a user. In some embodiments, the handle 500 can have a slip resistant surface, such as a rough surface or an attached increased friction surface, in order to reduce slippage by a user when operating the clamp assembly 300. It is noted that handle 500' as discussed herein can include any or all of the features regarding handle 500 discussed above.

Bow Hanger and Bow Slide

Figure 4A:
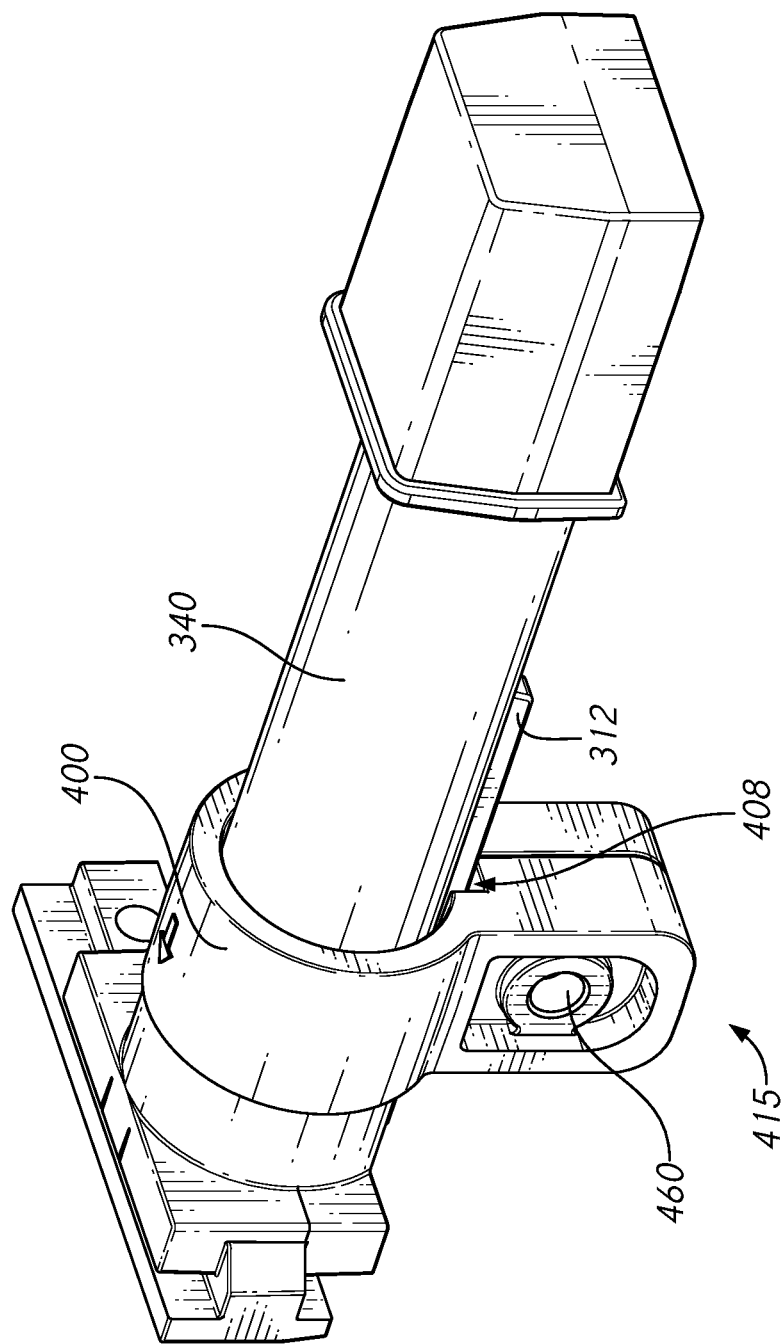
FIG. 4A illustrates a perspective view of a bow hanger and a bow slide in accordance with aspects of this disclosure.
Figure 4B:
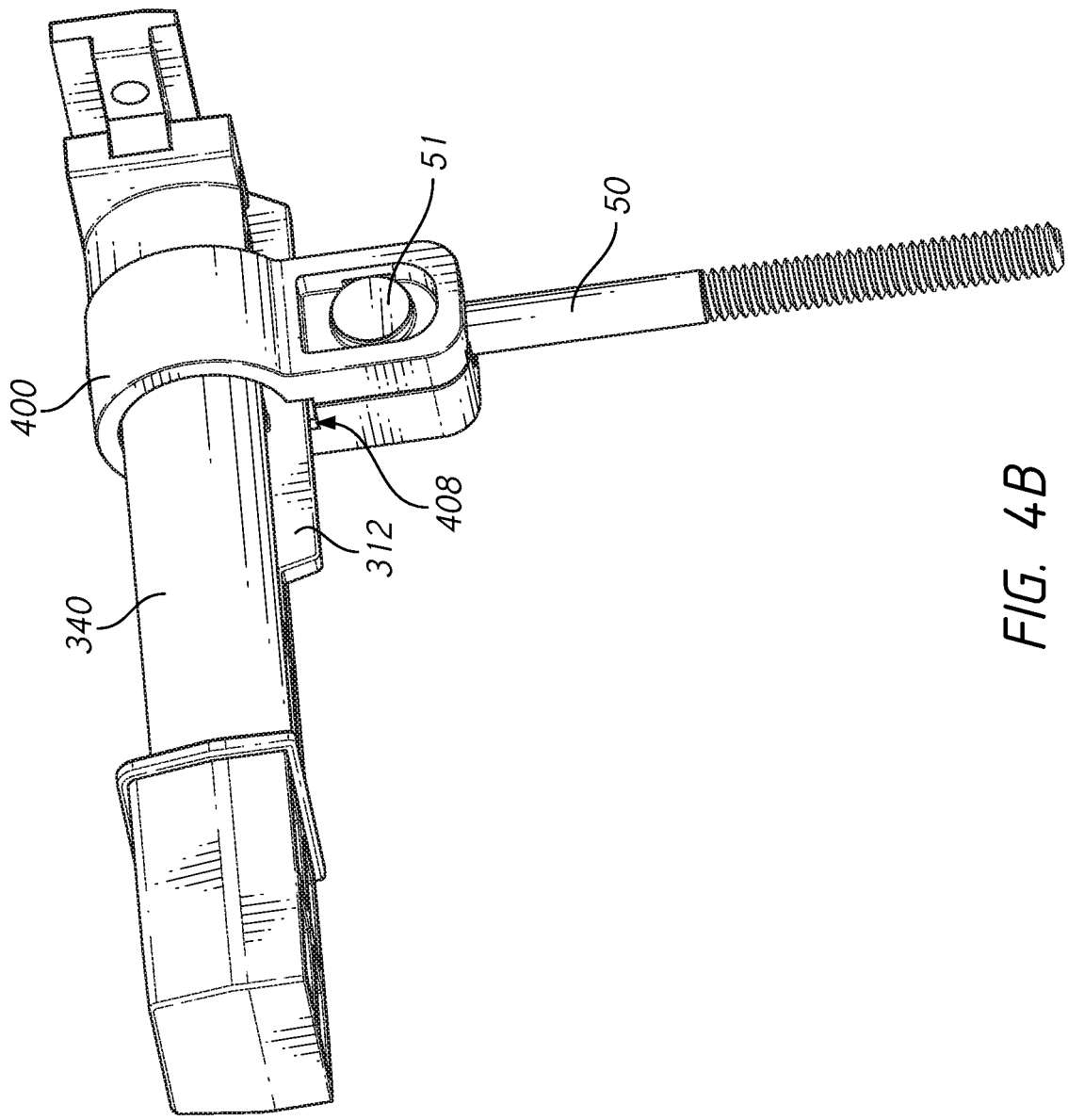
FIG. 4B illustrates a perspective view of the bow hanger and bow slide of FIG. 4A with a hanger bolt secured to the bow slide in accordance with aspects of this disclosure.
Figure 6C:
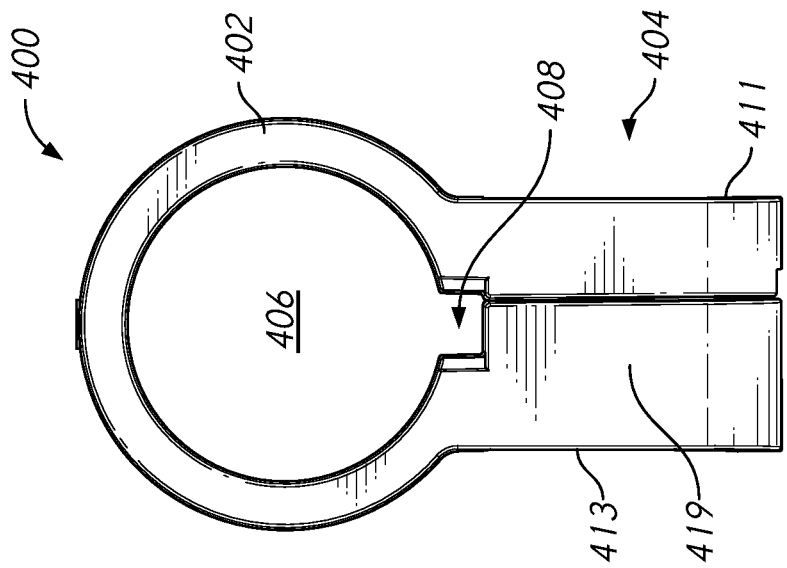
FIG. 6C illustrates a front view of the bow slide of FIG. 4A.
Figure 6D:
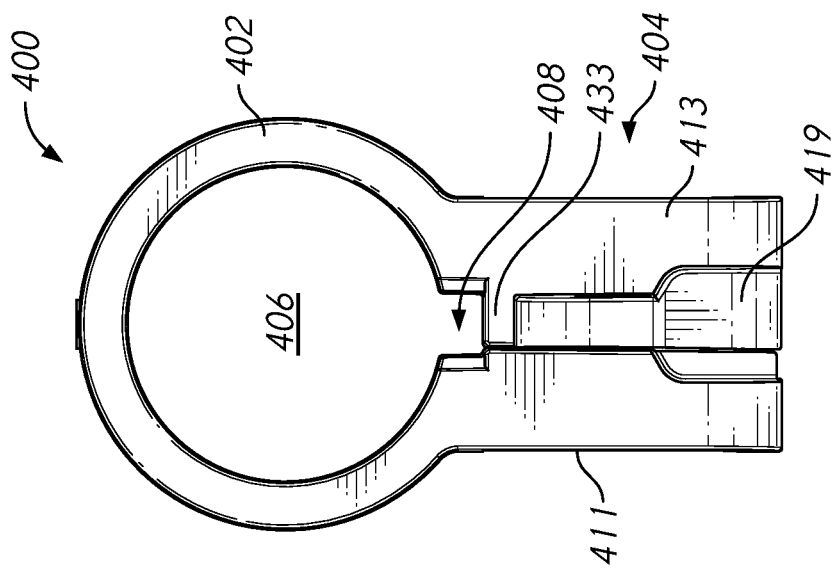
FIG. 6D illustrates a back view of the bow slide of FIG. 4A.

FIG. 4A illustrates a perspective view of an embodiment of a bow hanger 340 and a bow slide 400 which can be incorporated in the clamp assembly 300. FIG. 4B illustrates the bow hanger 340 and bow slide 400 along with a fastener 51 (which can be a spade bolt) which secures a hanger bolt 50 to the bow slide 340. Bow slide 400 can include an opening in a bottom end 415 (see FIG. 6C) which allows a hanger bolt 50 to be inserted into a portion of the bow slide 340. Bow slide 400 can include an opening 460 extending through sides of the bow slide which allows fastener 51 to pass. Fastener 51 can pass through opening 460 and an opening in a portion of hanger bolt 50 so as to secure the hanger bolt 50 to the bow slide 400.

As shown in FIGS. 4A-4B, bow slide 400 can secure to the bow hanger 340 and can be configured to move or slide along the bow hanger 340 or a portion thereof (such as the main body 306 of bow hanger 340). The bow slide 400 can slide along the bow hanger 340 in a direction generally parallel to an axis running through the bow hanger 340. As discussed in more detail below, the bow hanger 340 can include a protrusion 312 which extends along a portion of the bow hanger 340. Such protrusion 312 can mate with, engage, and/or fit within a slot 408 (also referred to as a "keying slot" herein) of the bow slide 400. Such mating and/or engagement between the protrusion 312 and the slot 408 can reduce or eliminate rotation of the bow slide 400 with respect to the bow hanger 340, which can in turn prevent other components of the clamp assembly 300 from rotating. For example, when the hanger bolt 50 connects the cam follower 600 and the handle 500 to the bow slide 400 and bow hanger 340, the cam follower 600 and handle 500 can be prevented from rotating about the bow hanger 340 (such as an axis of the bow hanger 340) when the protrusion 312 of the bow hanger 340 engages the slot 408 of the bow slide 400. As discussed further herein, an end of the bow hanger 340 (such as an end 342 of the bow hanger 340) can connect into or around an end of each of the bows 200 and another end of the bow hanger 340 can secure to the rail 102 (for example, via a guide 309 at an end 341 of bow hanger 340).

FIGS. 5A-5B illustrate the bow hanger 340 without the bow slide 400 attached. As shown, the bow hanger 340 includes a first end 342 and a second end 341 opposite the first end 342. The bow hanger 340 can include a bow attachment portion 304 (also referred to herein as a "tail") at the first end 342 that can attach to an end of the bow 200. The end 342 can connect to other otherwise attach with the bow 200. The end 342 can, for example, fit within an aperture in the bow 200. In some embodiments, the end 342 can surround an end of the bow 200. The tail 304 can be removable or permanently attached to the bow 200. The bow hanger 340 can include a guide 309 at end 341 which can attach to the side rails 102 as discussed above. The bow hanger 340 can include a main body 306 extending between ends 341, 342 of the bow hanger 340. The main body 306 can define a space or length that allows the bow slide 400 to slide there along. The main body 306 can have a cross section that is smaller than a cross section of the tail 304. The bow hanger 340 can include a collar 311 proximate end 341 and/or guide 309. The collar 311 can have a cross section that is greater than the cross section of the main body 306. The greater cross sections of the collar 311 and/or tail 304 relative to the main body 306 can limit the distance and/or length that the bow slide 400 is permitted to move or slide when secured around the main body 306. In some embodiments, the bow hanger 340 includes a rim 307 separating the main body 306 from the tail 304. The rim 307 can have a greater cross section than the tail 304 and/or the main body 306. The rim 307 can extend outwardly from a portion of the tail 304 (such as an end of the tail 304 proximate to the main body 306). As shown, the tail 304 can have a generally rectangular cross section. In some embodiments, the cross section of the tail 304 can be circular, hexagonal, pentagonal, or otherwise shaped or a combination of these shapes and the particular cross section does not limit the disclosure.

The main body 306 can be generally cylindrical, but the shape and/or cross section of the main body 306 does not limit the disclosure. The main body 306 can be sized for the bow slide 400 to surround and at least partially translate and/or rotate on and/or around. Opposite the bow attachment portion 304, the bow hanger 340 can include a rail attachment portion 308. The rail attachment portion 308 can include guide 309 which can attach to the rail 102, such as by slidably or otherwise attaching as discussed above. The rail attachment portion 308 and/or guide 309 can permanently or removably attach to the rail 102. The guide 309 can be integral or non-integral with the rail attachment portion 308. The guide 309 and/or rail attachment portion 308 can be located at end 341 of the bow hanger 340, which is opposite and end 342 of the bow hanger 340 which can secure to an end of a bow 200.

The main body 306 can have a length of greater than 1, 2, 3, 4, 5, 6, 7, 8, 9, 10, 11, or 12 inches. In some embodiments, the main body 306 can have a length of less than 2, 3, 4, 5, 6, 7, 8, 9, 10, 11, or 12 inches. The main body 306 can be generally solid in some embodiments or generally hollow in other embodiments. As shown in FIG. 5B, the bow hanger 340 can have hollow sections along a length thereof. For example, the main body 306 can have one or more hollow sections along its length and/or width, and/or the bow attachment portion 304 can have one or more hollow sections along its length and/or width. The one or more hollow sections can advantageously reduce material, weight, and cost of the bow hanger 340.

As mentioned above, FIG. 5B illustrates an underside or bottom view of the bow hanger 340 with the bow slide 400 removed to better illustrate the bow hanger 340. As shown, a bottom plane or surface of the bow hanger 340 can include be generally flat. For example, the main body 306 can include a flat bottom surface or plane 310 and/or the tail 304 can include a flat bottom surface or plane 321. As another example, where the main body 306 is cylindrical or partially cylindrical in shape or cross section, a bottom of the cylinder of the main body 306 may be cut off or trimmed to form the flat surface 310. However, in some embodiments the main body 306 has a fully cylindrical shape. In some embodiments, the flat surface 310 only extends a portion of the length of the main body 306.

Extending away from the main body 306, such as from the flat surface 310, is a protrusion 312 (also referred to as an "extension," "rib," "key," or "tab"). For example, the protrusion 312 can extend radially outward from the main body 306 and can extend from an outer or exterior surface of the main body 306. The rib 312 can be generally centered on a bottom of the main body 306. The rib 312 can extend partially or fully along a length of the main body 306. In some embodiments where the main body 306 includes a flat surface 310, the rib 312 can extend along the flat surface 310 and at a middle of a width of the flat surface 310. A length of the main body 306 may be described as extending between ends 341, 342 of the bow hanger 340 and/or as extending between the rail attachment portion 308 and the tail 304. For example, the rib 312 can extend 10%, 20%, 30%, 40%, 50%, 60%, 70%, 80%, 90% or 100% along a length of the main body 306. In some embodiments, the rib 312 can extend greater than 10%, 20%, 30%, 40%, 50%, 60%, 70%, 80%, or 90% along a length of the main body 306. In some embodiments, the rib 312 can extend less than 10%, 20%, 30%, 40%, 50%, 60%, 70%, 80%, 90%, or 100% along the length of the body portion 306. In some embodiments, the rib 312 extends along a first portion of the main body 306 but does not extend along a second portion of the main body 306. In some embodiments, the first portion is greater than the second portion. Having the rib 312 extend along a first portion of the main body 306 that is greater than a second portion of the main body that does not include the rib 312 can allow for greater accommodation in truck side wall 107 dimensional variation because it can allow the bow slide 304 (and/or connected hanger bolt 50, cam follower 600, and handle 500) to be positioned closer or further from an end 341 of the bow hanger 340 (see, for example, FIGS. 3A-3B), while still also limiting the ability of the bow slide 340 (and connected components) from rotating about the bow hanger 340.

In some embodiments, the rib 312 can extend ⅛ inch, ¼ inch, ⅓ inch, or ½ inch down from the flat surface 310. In some embodiments, the rib 312 can extend greater than ⅛ inch, ¼ inch, ⅓ inch, or ½ inch down from the flat surface 310. In some embodiments, the rib 312 can extend less than ⅛ inch, ¼ inch, ⅓ inch, or ½ inch down from the flat surface 310. The rib 312 can include a generally rectangular bottom surface or plane, though the particular shape does not limit the disclosure and other shapes (e.g., triangular, circular, oval) can be used as well.

In some embodiments, the rib 312 can extend further downwards than the bow attachment portion 304 and/or the rail attachment portion 308 (see FIGS. 3A-3B and 5B). In some embodiments, the rib 312 can have a width substantially less than a width of the main body 306 (or a width of the flat surface 310 of the main body 306 where the main body 306 has such flat surface 310). In some embodiments, the rib 312 can have a width of approximately 1%, 2%, 3%, 4%, 5%, 10%, 15%, 20%, 25%, 30%, 35%, 40%, 45%, or 50% of the width of the main body 306. In some embodiments, the rib 312 can have a width of greater than approximately 1%, 2%, 3%, 4%, 5%, 10%, 15%, 20%, 25%, 30%, 35%, 40%, 45%, or 50% of the width of the main body 306. In some embodiments, the rib 312 can have a width of less than approximately 1%, 2%, 3%, 4%, 5%, 10%, 15%, 20%, 25%, 30%, 35%, 40%, 45%, or 50% of the width of the main body 306. In some embodiments, the rib 312 has a width of between 1/10 and ½, between ⅕ and ½, between ¼ and ½, or between ⅓ and ½ of a width of the main body 306.

FIGS. 6A-6F illustrate bow slide 400. As discussed elsewhere herein, bow slide 400 can be configured to slide along a length of the bow hanger 340 (for example, a length of the main body 306). As also discussed elsewhere herein, bow slide 400 can be configured to at least partially mate with rib 312 so as to lock, reduce, and/or minimize rotation of the bow slide 400 about bow hanger 340. The bow slide 400 can have a head 402 and a body 404. The head 402 can be sized and/or shaped to receive a portion of the bow hanger 340, such as the main body 306. The head 402 can be circular and/or cylindrical in some embodiments. Alternatively, the head 402 can be non-circular. For example, the head 402 can be rectangular, square, triangular, among other shapes, or a combination of these shapes. The head 402 can form an aperture 406 configured to fit around the main body 306 of the bow hanger 340 so that the bow slide 340 can slide along a length of the main body 306. The aperture 406 can be generally circular as shown, but in some embodiments may be different shapes (or a combination of shapes) in order to fit along the main body 306. For example, the aperture 406 can be rectangular, square, triangular, among other shapes and/or shape combinations. In some embodiments, the aperture 406 can be completely round with no keying flat (or other flat surface).

As discussed above, the bow slide 400 can include a slot 408 sized and/or shaped to receive the rib 312. In some embodiments, the slot 408 is positioned proximate to the aperture 406 defined by the head 402. The aperture 406 and the slot 408 can together comprise a continuous opening in the bow slide 400 in some embodiments. In some embodiments, the slot 408 (also referred to herein as an "aperture extension") extends from the aperture 406 along a perimeter of the aperture 406. Slot 408 can be generally at a bottom of the aperture 406 (or generally at the bottom of the head 402) and can extending at least partially into and/or through the body 404 of the bow slide 400. The slot 408 can be sized and/or shaped to retain the rib 312 of the main body 306. For example, the slot 408 can have a cross section or shape which corresponds to a cross section or shape of rib 312. In some embodiments, the slot 408 and rib 312 have a square, rectangular, or circular cross section. Thus, when the rib 312 is in the slot 408, such as shown in FIG. 4A, the bow slide 400 is limited and/or completely prevented from rotating around the main body 306 of the bow hanger 340. However, when the bow slide 400 is translated into an area or portion of the bow hanger 340 without the rib 312, the bow slide 400 can freely rotate around the bow hanger 340 (for example, main body 306), thus allowing the clamp assembly 300 to rotate between a stored position where the handle 500 extends generally parallel to the side rail 102 and a latching position where the handle 500 extends generally downwards (for example, transverse to the side rail 102). This allows the handle 500 to be moved out of the way which in turn allows better access to portions of the truck bed 100 nearby the clamp assembly 300.

In some embodiments, the bow slide 400 (and/or connected components such as the handle 500) can be rotated to be generally parallel with an axis of the side rail 102 which runs through a length of the side rail 102. In some embodiments, bow slide 400 (and/or connected components such as the handle 500) can be rotated approximately 45, 50, 60, 70, 80, 90, 100, 110, 120, 130, 140, 150, 160, or 180 degrees around bow hanger 340 (or portions thereof such as the main body 306). In some embodiments, bow slide 400 (and/or connected components such as the handle 500) can be rotated less than approximately 45, 50, 60, 70, 80, 90, 100, 110, 120, 130, 140, 150, 160, or 180 degrees around bow hanger 340 (or portions thereof such as the main body 306). In some embodiments, bow slide 400 (and/or connected components such as the handle 500) can be rotated greater than approximately 45, 50, 60, 70, 80, 90, 100, 110, 120, 130, 140, 150, 160, or 180 degrees around bow hanger 340 (or portions thereof such as the main body 306).

As shown, the body 404 of bow slide 400 can be two separable or moveable portions that can be connected, such as by a fastener 51 (such as a rivet, bolt, or screw). In some embodiments, the bow slide 400 can have sufficient flexibility to snap over a portion of the bow hanger 340. For example, with reference to FIG. 4A, the bow slide 400 can be positioned around the main body 306 of the bow hanger 340 by movement of the arms 411, 413 away from one another, thus opening the body 404 and allowing the bow slide 400 to fit around the main body 306 (see also FIG. 13A). Once the arms 411, 413 of the body 404 are moved passed a width or length of the main body 306, the main body 306 can fit within the aperture 406 of the head 402 of the bow slide 400. After the bow slide 400 is positioned around the main body 306, the two arms 41, 413 of the body 404 can be secured together with fastener 51 which can extend through opening 460 in the body 404. Such securement can hold the bow slide 400 onto the main body 306 of the bow hanger 340. This configuration for the bow slide 400 advantageously increases the ease of assembling the clamp assembly 300.

As shown in FIGS. 6A-6F, the bow slide 400 can include structure that prevents or limits movement and/or rotation of the bow slide 400 with respect to the hanger bolt 50 when the hanger bolt 50 is secured thereto. For example, the body 404 of bow slide 400 can include a back wall 419 extending along a back surface of the bow slide 400. The back wall 419 can prevent the hanger bolt from rotating about an axis running through a height of the bow slide 400, which can in turn prevent the cam follower 600 and/or the handle 500 from rotating in such manner when connected to the hanger bolt 50. In some embodiments, the back wall 419 is formed from one or both of the arms 411, 413.

As discussed above, the bow slide 400 can include a slot 408 sized and/or shaped to receive, mate with, secure (or partially secure) a protrusion 312 of the bow hanger 340. The slot 408 can be sized and/or shaped to match or partially match a size and/or shape of the protrusion 312. The slot 408 can have a cross section that corresponds to, matches, or partially matches a cross section of protrusion 312. In some embodiments, the slot 408 is positioned near a perimeter of the aperture 406 of the head 402. In some embodiments, the slot 408 has a rectangular cross section. In some embodiments, the slot 408 has beveled or chamfered edges 431 on one or both sides of an end of slot 408 and/or one or both sides of each end of slot 408 (see FIGS. 6E-6F). The beveled or chamfered edge(s) 431 can help facilitate insertion and/or removal of the protrusions 312 into and/or through the slot 408, which can be advantageous where dimensional tolerances are close or tight. In some embodiments, the protrusion 312 has a height that is less than or equal to a height of the slot 408. In some embodiments, the protrusion 312 has a width that is less than or equal to a width of the slot 408. In some embodiments, the slot 408 is formed from a recess in the bow slide 400. In some embodiments, the slot 408 is formed from a recess in the body 404 of the bow slide 400. In some embodiments, the slot 408 is formed at least partially by a notch 433 that extends outward from a portion of the body 404 (see FIGS. 6F and 6C). For example, the notch 433 can extend outward from an arm 413 of body 404 and can extend toward arm 411. Notch 433 can extend perpendicular or transverse to arm 413 of body 404. A top surface of the notch 433 can form a lower surface of the slot 408 (see, for example, FIGS. 6F and 6C).

Handle and Cam Follower

FIG. 7A illustrates a side view of an embodiment of the handle 500 without also showing the hanger bolt 50. The handle 500 can include a first or top end 513 and a second or bottom end 515. The handle 500 can have a first side 517 and a second side 519. When the clamp assembly 300 is in use, the first side 517 can face toward a side wall 107 of the truck bed 100 (when the clamp assembly 300 is in an installed position) and the second side 519 can face away from that same side wall 107 (when the clamp assembly 300 is in an installed position). As shown, the handle 500 can include a lever or lever portion 502 and a cam 506. While FIG. 7A does not include the hanger bolt 50, the hanger bolt 50 can secure to the handle 500 via a fastener 52 (see FIGS. 3A-3B) at a pivot point 504. The fastener 52 can have a threaded hole which secures to a threaded surface of the hanger bolt 50, and the fastener 52 can extend through an aperture extending a width of the handle 500. The lever 502 can extend away from the pivot point 504 and thus provide a lever arm 502' when the lever 502 is rotated by a user. The pivot point 504 can be a location about which the handle 500 rotates in order to transition from an open (unclamped) to a closed (clamped) position. The pivot point 504 can be at a center of the aperture 531 extending the width of the handle

500. In some embodiments, the cam follower 600 is positioned at point 523 on a surface of end 513 of the handle 500 when the clamp assembly 300 is in a clamped position. In such configuration, a maximum compression force is experienced at point 521 on a surface of the first end 513 which is closer to the second side 519 than is point 523. Advantageously, the location of the maximum compression force 521 in relation to the pivot point 504 can prevent or reduce the possibility of the cam follower 600 and/or the handle 500 inadvertently moving or vibrating out of position, which thereby could result in unlatching of the tonneau cover 101.

Generally opposite the lever 502 can be the cam 506. The cam 506 can be curved and can extend along a portion of the first end 513 and/or a portion of the side 519. The cam 506 can extend along a curve of the handle 500 such as along top surface 501 and partially along a surface 503 of side 519. The cam follower 600 can follow and/or slide along the cam 506, moving the cam follower 600 between a latched position (where the cam follower 600 is on the top surface 501) and an unlatched position (where the cam follower 600 is positioned along or at surface 503) as the handle 500 rotates. Thus, the cam follower 600 can translate along the cam 506 as the handle 500 is rotated.

FIG. 7B illustrates an embodiment of a handle 500 including a cam 506 on the handle 500. The cam 506 can comprise one or more ridges or rails that extend from a surface of the handle 500. In some embodiments, the cam 506 comprises at least one ridge or rail extending from a surface of the handle 500 (such as an exterior surface 507 as discussed below). As shown, the handle 500 can include an opening or slot 508 so that the handle 500 can rotate around the hanger bolt 50, the hanger bolt 50 fitting within the slot 508. The slot 508 can be generally centered on the handle 500. The slot 508 can extend at least 10%, 20%, 30%, 40%, 50%, or 60% of the length of the handle 500 (e.g., from top surface 501 to lever 502). In some embodiments, the slot 508 can extend less than 10%, 20%, 30%, 40%, 50%, or 60% of the length of the handle 500.

In some embodiments, the cam 506 can extend away from the handle 500. For example, the cam 506 can extend away from an outer surface 507 of the handle 500. The cam 506 can extend away from the outer surface 507 towards an outer or maximum width of the handle 500 (see FIG. 7B). Handle 500 can have an inner surface 509 which can be proximate slot 508. Handle 500 can have two inner surfaces 509 proximate the slot 508 (FIG. 7B shows one of such inner surfaces 509). The two inner surfaces 509 can face each other.

Figure 7C:
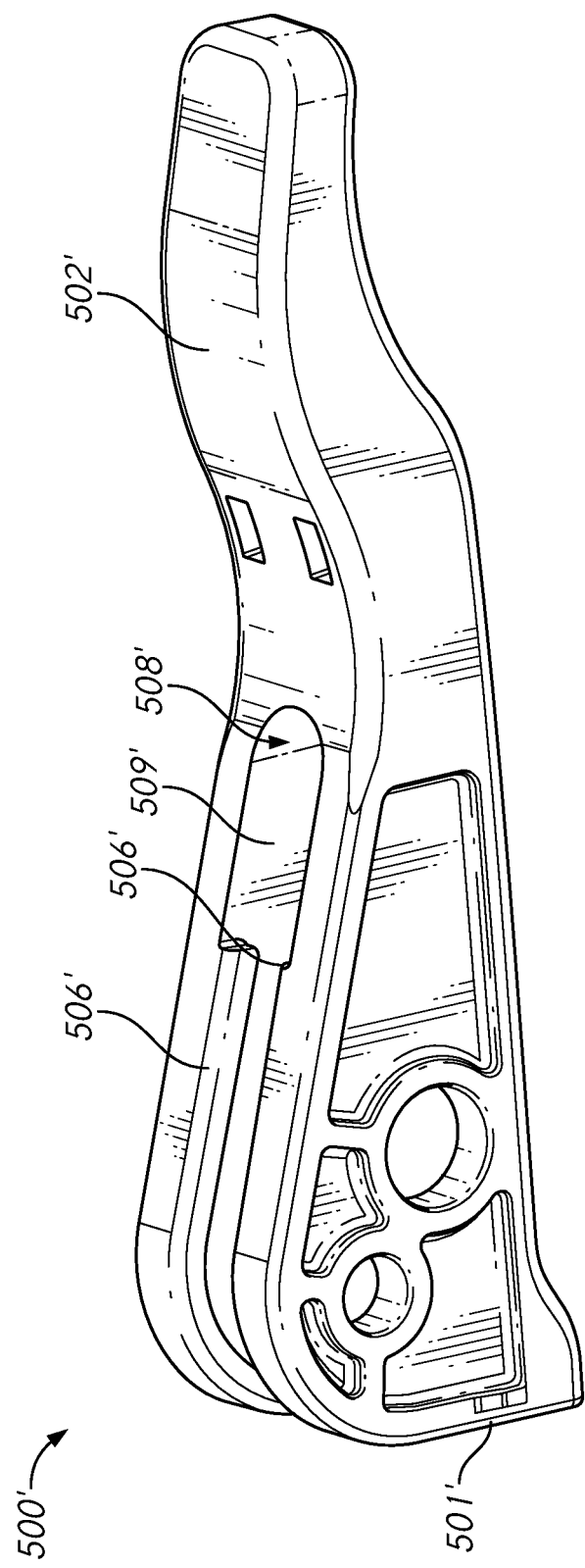
FIG. 7C illustrates a perspective view of another embodiment of a handle in accordance with aspects of this disclosure.

FIG. 7C illustrates another embodiment of a handle 500' including a cam 506' on the handle 500'. Handle 500' can be the same in many, some, or all respects as handle 500.

The cam 506' can comprise one or more ridges or rails that extend from a surface of the handle 500'. In some embodiments, the cam 506' comprises at least one ridge or rail extending from a surface of the handle 500' (such as an interior surface 509' as discussed below). As shown, the handle 500' can include an opening or slot 508' so that the handle 500' can rotate around the hanger bolt 50, the hanger bolt 50 fitting within the slot 508'. The slot 508' can be generally centered on the handle 500'. The slot 508' can extend at least 10%, 20%, 30%, 40%, 50%, or 60% of the length of the handle 500' (e.g., from top surface 501' to lever 502'). In some embodiments, the slot 508' can extend less than 10%, 20%, 30%, 40%, 50%, or 60% of the length of the handle 500'.

In some embodiments, the cam 506' can extend towards a center of the handle 500' in the slot 508' on inner surface 509', as shown in FIG. 7C. Cam 506' can comprise a first ridge or rail that extends from an inner surface 509' of the handle 500' and along a portion of the handle 500'. In some embodiments, cam 506' comprises two rails that extend from inner surfaces 509' of the handle 500' and toward each other. Handle 500' can have two inner surfaces 509' proximate the slot 508' (FIG. 7C shows one of such inner surfaces 509'). The two inner surfaces 509' can face each other.

The cams 506, 506' can follow along a shape of the handle 500, 500'. Thus, there can be an outward facing cam 506 or an inward facing cam 506'. In some embodiments, the handle 500, 500' can includes both cams 506, 506'.

Figure 8B:
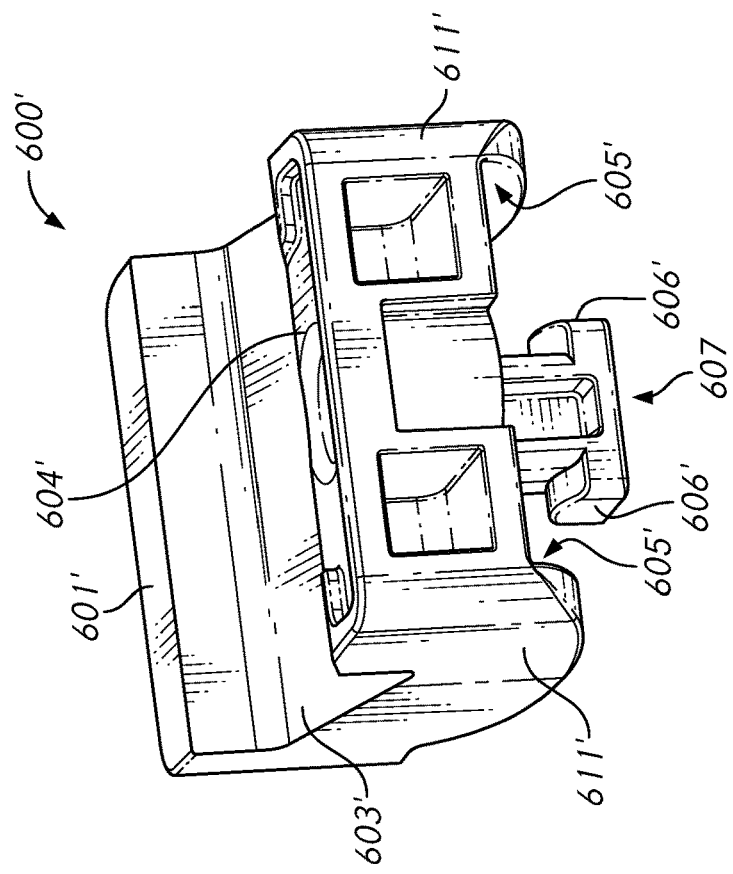
FIG. 8B illustrates a perspective view of another embodiment of a cam follower in accordance with aspects of this disclosure.

Cams 506, 506' of handles 500, 500' can mate with cam followers 600, 600'. For example, cam 506 of handle 500 as shown in FIG. 7B can mate and/or engage with cam follower 600 as shown in FIG. 8A and cam 506' of handle 500' as shown in FIG. 7C can mate and/or engage with cam follower 600' as shown in FIG. 8B.

Figure 8A:
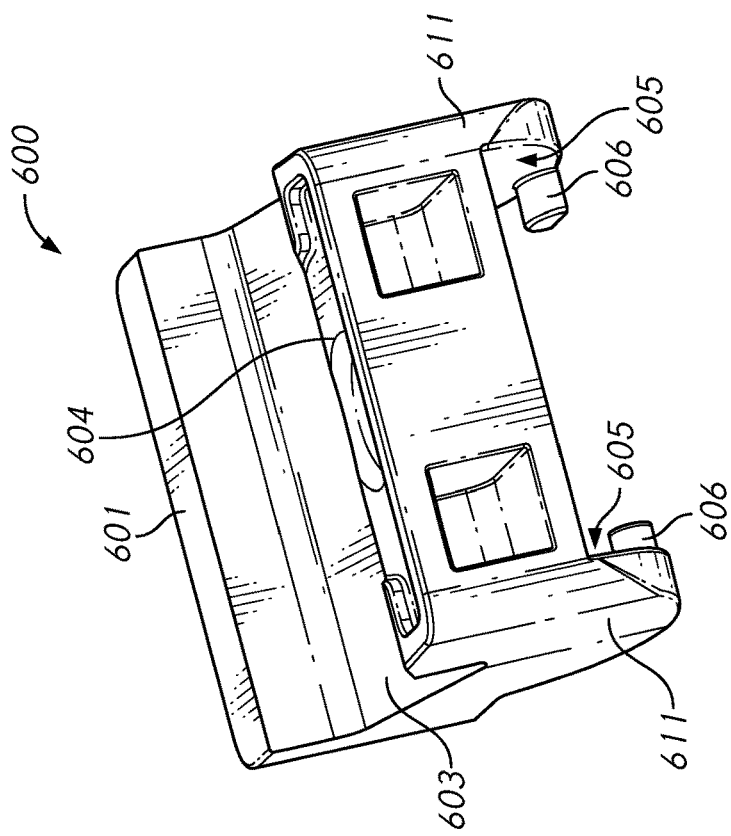
FIG. 8A illustrates a perspective view of an embodiment of a cam follower in accordance with aspects of this disclosure.

With reference to FIG. 8A, cam follower 600 can include a lip or latch 601 and an engagement surface 603 as discussed above, and can also include an aperture 604 on one side or end for receiving the hanger bolt 50 on an opposite side or end which allows the cam follower 600 to translate along the hanger bolt 50.

The latch 601 can be raised to provide an upward force on a portion of a vehicle, such as a side wall 107 or a side rail, to keep the clamp assembly 300 attached to the vehicle. In some embodiments, the latch 601 can include a pad or other flexible/pliable material. Thus, when the pad presses against a portion of the side wall 107 (for example, a flange of the side wall 107), it can soften contact with the flange. The pad can mold and/or deform against the bottom of the side wall 107 to give improved grip. Further, the pad can be made of a slip resistant material, or can be coated by a slip resistant material, which can allow the pad to remain in the desired position, even if some minimal forces were to act on the clamp assembly 300. In some embodiments, the pad can be generally circular, but the shape of the pad does not limit the disclosure, and square, triangular, or rectangular pads can be used as well.

Cam follower 600 can include arms 611 (also referred to herein as "tabs") extending downward from the engagement surface 603 near ends of the cam follower 600. The arms 611 can extend downwards from outer width edges of the cam follower 600. Cam follower 600 can include one or more retainers 606 extending from a surface of the cam follower 600. For example, cam follower 600 can include a pair of retainers 606 extending towards an interior of the cam follower 600 and toward each other. The retainers 606 can extend from an inner surface of the arms 611 of the cam follower 600. Retainers 606 can extend inwards from an outer width of the cam follower 600. In some embodiments, at least one retainer 606 extends inwards from the arms 611 of the cam follower 600. Such inwardly extending retainers 606 can follow along (for example, mate) with the outward-extending cam 506 shown in FIG. 7B. Retainers 606 can form a generally "U" shape.

With reference to FIG. 8B, cam follower 600' can include a lip or latch 601' and an engagement surface 603' as discussed above, and can also include an aperture 604' on one side or end for receiving the hanger bolt 50 on an opposite side or end which allows the cam follower 600' to translate along the hanger bolt 50.

The latch 601' can be raised to provide an upward force on a portion of a vehicle, such as a side wall 107 or a side rail, to keep the clamp assembly 300 attached to the vehicle. In some embodiments, the latch 601' can include a pad or other flexible/pliable material. Thus, when the pad presses against a portion of the side wall 107 (for example, a flange of the side wall), it can soften contact with the flange. The pad can mold and/or deform against the bottom of the side wall 107 to give improved grip. Further, the pad can be made of a slip resistant material, or can be coated by a slip resistant material, which can allow the pad to remain in the desired position, even if some minimal forces were to act on the clamp assembly 300. In some embodiments, the pad can be generally circular, but the shape of the pad does not limit the disclosure, and square, triangular, or rectangular pads can be used as well.

Cam follower 600' can include arms 611' extending downward from the engagement surface 603' near ends of the cam follower 600'. The arms 611' can extend downwards from outer width edges of the cam follower 600'. Cam follower 600' can include a stem 607 (also referred to herein as a "tab") which can extend downwards from a surface of the cam follower 600'. For example, the stem 607 can extend from a bottom surface of the cam follower 600'. Stem 607 can be positioned at a center of the cam follower 600', such as a center of a bottom surface of the cam follower 600'. Stem 607 can have a first end connected and/or integral with a surface of the cam follower 600' and can have a second end opposite the first end that can be a free or cantilevered end. The stem 607 can include one or more retainers 606' which can extend from surfaces of the stem 607. The retainers 606' can extend outwardly from the stem 607 and can extend toward an outer width of the cam follower 600'. For example, the retainers 606' can extend outwardly toward arms 611'. Retainers 606' can extend toward outer edges of the cam follower 600'. In some embodiments, the stem 607 includes a pair of retainers 606' extending from opposite sides or surfaces of the stem 607. In some embodiments, at least one retainer 606' extends outwardly from the stem 607 of the cam follower 600'. Such outwardly extending retainers 606 can follow along (for example, mate) with the inward-extending cam 506' shown in FIG. 7C. In some embodiments, the stem 607 and retainers 606' form a "T" shape (see FIG. 8B).

Advantageously, in the configuration of the handle 500' and cam follower 600' of FIGS. 7C and 8B, the inward extending cam 506' and outwardly extending retainers 606' can allow for reduced accumulation of dirt or breakage of the cam 506' and cam follower 600' during operation. This is a result of incorporating the engagement of the cam 506' and retainers 606' within an interior of the handle 500'. Such configuration can also minimize the profile of the handle 500', which can allow for easier gripping or handling by a user.

Figure 9:
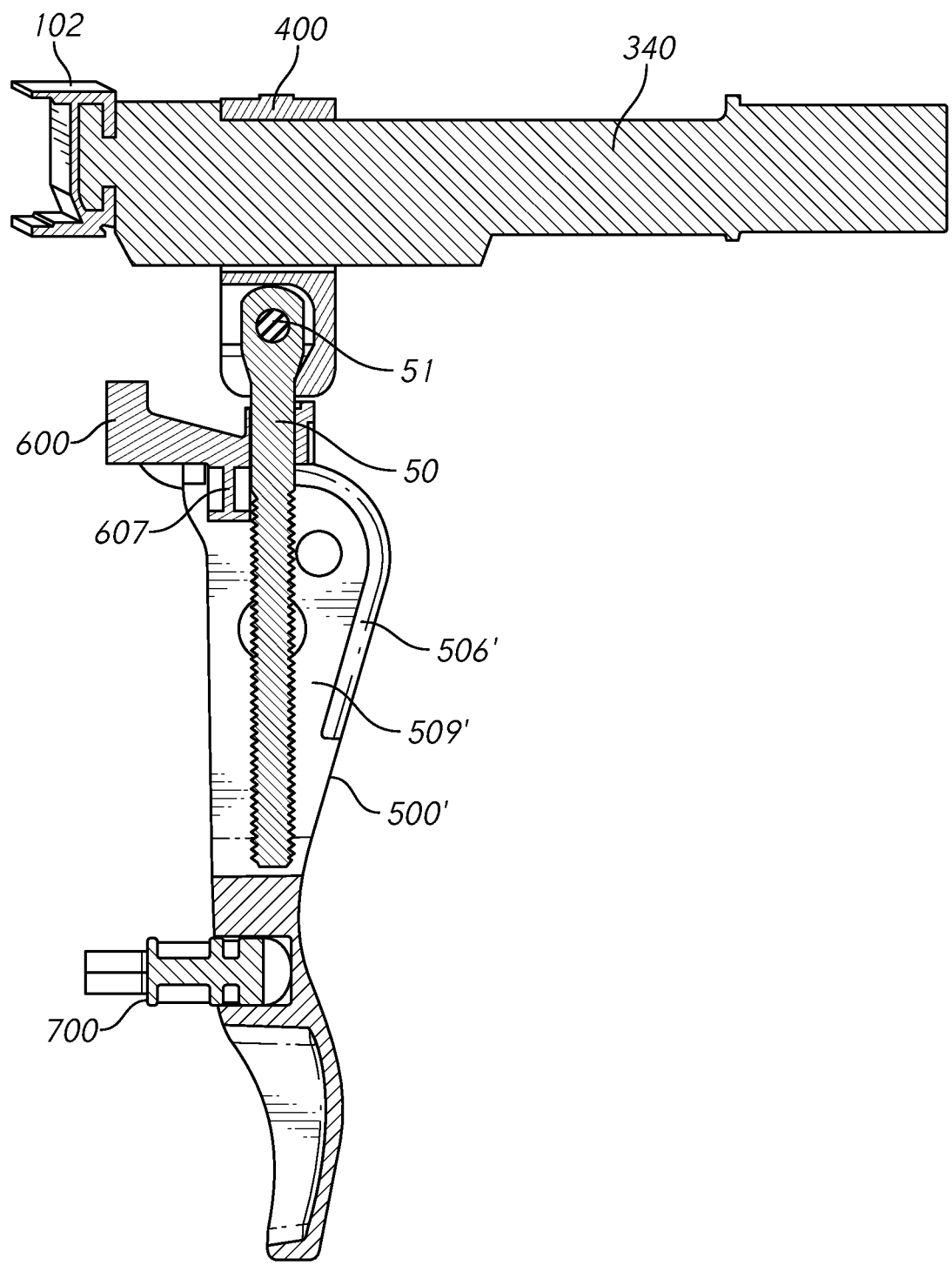
FIG. 9 illustrates a cross section of an embodiment of a clamp assembly in accordance with aspects of this disclosure.

FIG. 9 illustrates the clamp assembly 300 in cross section to better view internal components. While FIG. 9 shows cam follower 600' and handle 500', a similar cross section could be illustrated with cam follower 600 and handle 500. FIG. 9 illustrates how stem 607 (and/or retainers 606') can engage rails 506' on inner surfaces 509' of handle 500'.

Stow Clip

FIGS. 10A-10B illustrate an embodiment of a stow clip 700 attached to each of the handles 500, 500'. The stow clip 700 can be integral with the handle 500 or can be configured to removably or permanently attach to the handle 500, 500'. In some embodiments, the stow clip 700 is the same regardless of the handle. In some embodiments, the stow clip 700 can be modified based on the dimensions or geometry of the handle or portions thereof. As shown, the stow clip 700 can be located near a center and/or towards the bottom of the handles 500, 500'. For example, the stow clip 700 can be located and/or can attach to a portion of the lever 502, 502' of handle 500, 500'. The stow clip 700 can be generally cylindrical in shape, though the particular shape does not limit the disclosure. The stow clip 700 can be removable from the handles 500, 500' in some embodiments, such as if a user applied a force on the stow clip 700 away from the handles 500, 500'. In some embodiments, the stow clip 700 is permanently attached to the handles 500, 500'. In some embodiments, more than one stow clip 700 can be used. In some embodiments, the stow clip 700 can be secured to the handle 500, 500' such that a first end of the stow clip 700 remains secured to the handle 500, 500' before, during, and/or after a second, opposite end of the stow clip 700 is secured to a side rail 102, as discussed in more detail below.

As shown, the stow clip 700 can include two flexible arms 702 spaced apart by a gap. This allows the arms 702 to bend inwards and outwards. Thus, the arms 702 can be compressed inwards when entering a slot in the side rail 102, and flex outward once in the slot to frictionally retain the stow clip 700 (and thus the handle 500) in a secured or proper position. In some embodiments, one or more of the arms 702 can include a slot or recess 704 on an outer surface, which can be configured to mate with a portion of the side rail 102 to further retain the stow clip 700. In some embodiments, the stow clip 700 can include a flexible or expandable head portion. Thus, the flexible arms 702 advantageously allow the stow clip 700 to secure the handle 500, 500' to a portion of the side rail 102 without having to slide the stow clip 700 in from an end of the side rail 102.

Figure 10C:
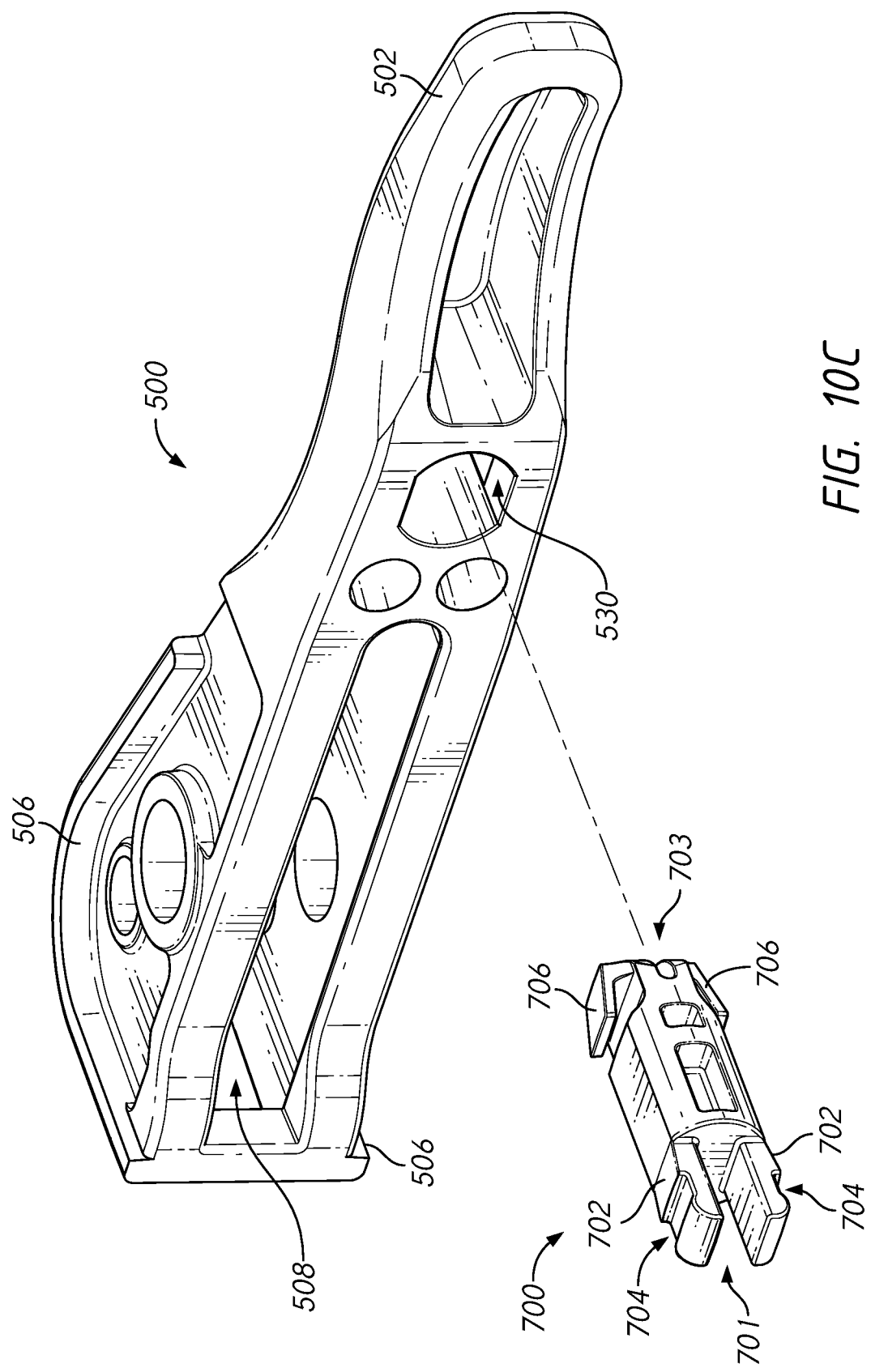
FIG. 10C illustrates an exploded view of the handle and stow clip of FIG. 10A in accordance with aspects of this disclosure.

FIG. 10C illustrates an exploded view of a stow clip 700 and a handle 500, and further illustrates how the stow clip 700 can be secured and/or attached to handle 500. As shown, an end of the stow clip 700, such as end 703, can be inserted into an opening or cavity 530 in the handle 500 and secured within such opening or cavity 530. As discussed elsewhere herein, stow clip 700 can have an end, such as end 701, that is opposite to end 713 and can secure to a portion of the side rails 102 (see also FIG. 10D). As also shown in FIG. 10D, end 703 of stow clip 700 can include one or more arms 706 which can be configured to secure to a portion of handle 500 as further described below. For example, end 703 can include two arms 706 which extend from or form the end 703. Arms 706 can extend outward from a center portion or body of the stow clip 700 in a first direction that is parallel to an axis running through a length of a body of the stow clip 700 and can also extend in a second direction that is non-parallel to the first direction. For example, the second direction can be perpendicular or transverse to the first direction. In some embodiments, the arms 706 extend in have a first portion that extends generally parallel to an axis running through a length of the stow clip 700 and have a second portion that extends back towards a center portion of the stow clip 700 and/or towards an opposite end of the stow clip 700 (such as end 701). The arms 706 can be spaced apart with a spacing. In some embodiments, the end 703 of the stow clip 700 includes two arms spaced apart by a gap and opposite along a perimeter of a cross section of the stow clip 700. FIG. 10E shows a front view of the handle 500 with the stow clip 700 attached. As shown, the cavity 530 in the handle can be positioned in a center of a width of the handle 500. The cavity 530 can be positioned below slot 508 in handle 500 in some embodiments (see FIGS. 10C and 10E). In some embodiments, the cavity 530 is positioned below a mid-height of the handle 500 (for example, where the handle 500 is oriented as shown in FIG. 10E).

FIGS. 10F-10I illustrate cavity 530 of the handle and one or more openings 550 of handle 500. FIG. 10F illustrates handle 500 with no stow clip 700 attached. FIG. 10H illustrates an enlarged view of the cavity 530 of handle 500. FIG. 10F illustrates a front perspective view of handle 500. The use of the term "front" here (with respect to the handle 500) means a view showing a surface or face of the handle 500 which faces the side walls 107 of the truck bed 100 when the clamp assembly 300 is in an installed position, such as a clamped position. FIG. 10G illustrates a back view of handle 500. The use of the term "back" here (with respect to the handle 500) means a view showing a surface or face of the handle 500 which faces away from the side walls 107 of the truck bed 100 when the clamp assembly 300 is in an installed position, such as a clamped position. As shown in FIG. 10G, a back surface of handle 500 can include openings 500, the purpose of which is described below. As shown in FIGS. 10F and 10H, handle 500 can include cavity 530 which can be sized and/or shaped to receive a portion of the stow clip 700, such as end 703 of stow clip 700. The cavity 530 can have a height and/or width that is greater than a height and/or width of the end 703 of stow clip 700. Handle 500 can include structure to allow end 703 of stow clip 700 to secure within. For example, handle 500 can include one or more slots 535 which allow one or more arms 706 to pass within. For example, as shown in the cross section FIG. 10J (which is taken along line A-A in FIG. 10E), slots 535 can permit arms 706 of the stow clip 700 to fit within. Further, handle 500 can include one or more walls 534 which can restrict or prohibit movement or displacement of arms 706. As shown, arms 706 of end 703 of stow clip 700 can be inserted into cavity 530 of handle 500, inserted through and/or into slots 535, and can engage walls 534 to restrict reverse or outward movement of end 703 of stow clip 700. End 703 of stow clip 700 can have an outer width defined by a distance between the arms 706 that is greater than a width of the cavity 530. Further, arms 706 can be flexible and/or resilient and can flex or bend when a force is applied against them. In such configuration, when arms 706 are inserted through cavity 530, they can flex inward, and, after they pass a length of the cavity 530 and approach the slots 535, they can flex outward and/or expand so as to partially fill the slots 535. Arms 706 can have extensions or tips 709 which can engage and/or contact walls 534 to keep the arms 706 secured within the slots 535. Further, a front portion of the arms 706 can engage, contact, and/or rest against a block or wall 536 which can help to limit or prevent further movement of the stow clip 700 once secured to the handle.

With reference to FIGS. 10G, 19I, and 10J, openings 550 can advantageously be provided to aid disassembly and/or removal of end 703 of stow clip 700 from handle 500. As discussed herein, the securement of the stow clip 700 to the handle 500 can be quite robust such that the end 703 of the stow clip 700 stays secured to the handle 500 when another end 701 of stow clip 700 is attached and/or removed from a side rails 102. Such strong securement can be due to the configuration of the arms 706 and/or handle as discussed above. In order to allow the end 703 to be removed from the slots 535 and/or cavity 530 of the handle 500, the handle can include openings 550, which can allow a tool to be placed therewithin and a force to be applied so as to flex the arms 706 inward. Such inward flexing of the arms 706 can allow the end 703 of the stow clip 700 to be pushed and/or pulled out of the cavity 530 and removed from the handle 500.

FIGS. 11A-11B illustrate the stow clip 700 attached to a side rail 102 for handles 500, 500'. FIG. 11A illustrates handle 500 and FIG. 11B illustrates handle 500'. In the position shown in FIGS. 11A-11B, the handle 500, 500' profile can extend over a top of the extrusion/side rail 102 by less than ¼, ⅛, or 1/16 of an inch. Because the handles 500, 500' can rotate about the bow hanger 340, the handles 500, 500' can be secured to portions of the side rail 102 on either side of the bow hanger 340. As shown, the bow slide 400 is off of (for example, not mated or not engaging with) the tab 312, allowing it to rotate.

Figure 11C:
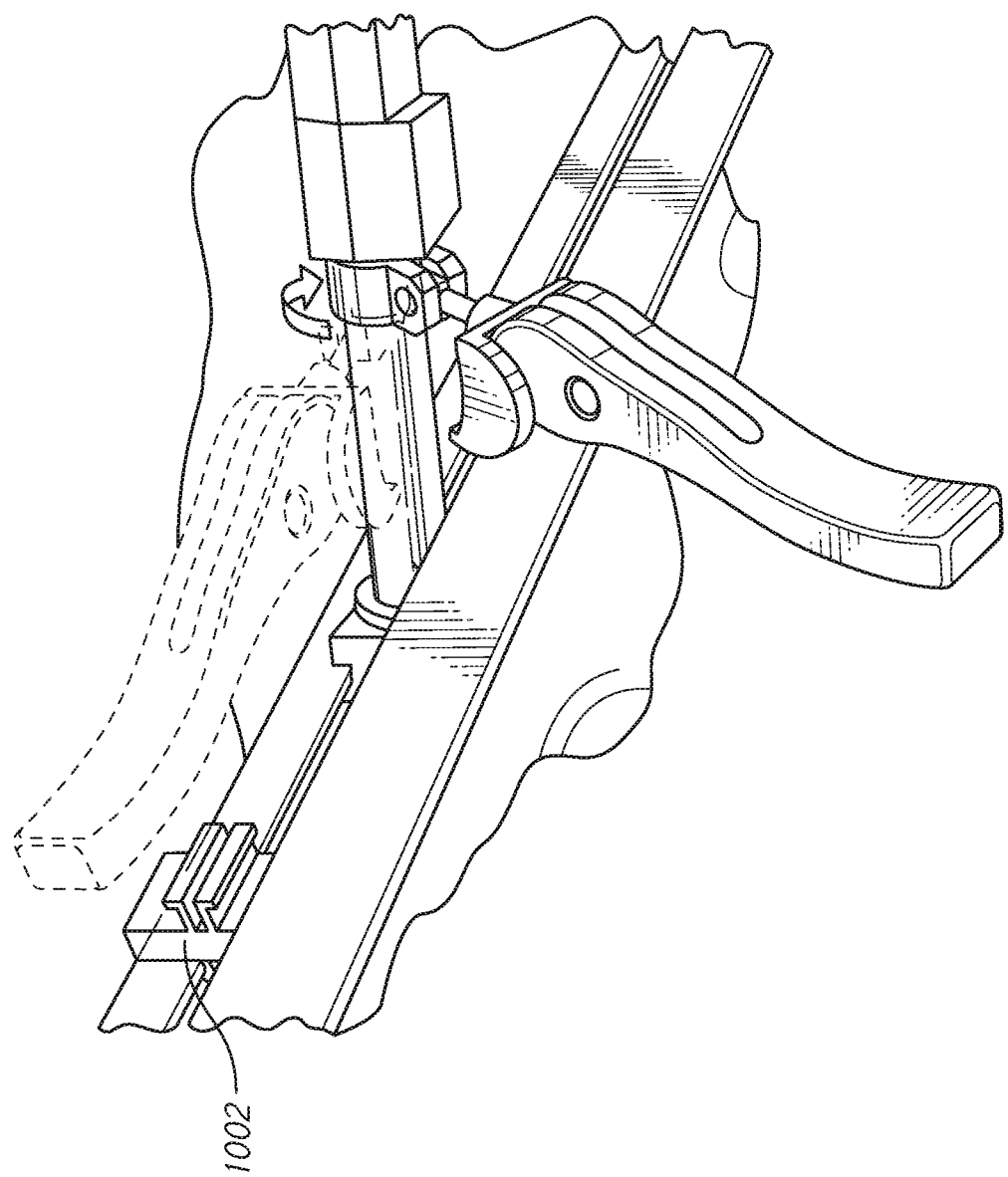
FIG. 11C illustrates a stow clip of the prior art.

The stow clip 700 can be advantageous over those in a prior art, such as shown in U.S. Pat. No. 7,823,957. As shown in FIG. 11C, the stow clip 1002 in U.S. Pat. No. 7,823,957 is independent from the handle, and must be installed into the rail before the handle can be stowed. As the stow clip shown in U.S. Pat. No. 7,823,957 slides in from the end of the extrusion, a change of stow location would require complete disassembly. Further, the stow clip 1002 of U.S. Pat. No. 7,823,957 must be offset to compensate for a width of the handle assembly.

On the other hand, the stow clip 700 disclosed herein is attached to the handle 500/500' and can be attached at any point to the side rail 102 without requiring any disassembly of the clamp assembly 300. In some embodiments, the stow clip 700 is permanently attached into the handle 500/500'. In some embodiments, the stow clip 700 can be removably attached into the handle 500/500'. The stow clip 700 can be flexible in order to removable attach into the side rail 700, such as through friction. In some embodiments, the stow clip 700 is integral with the handle. In some embodiments, the stow clip 700 can be secured to the handle 500, 500' such that a first end of the stow clip 700 remains secured to the handle 500, 500' before, during, and/or after a second, opposite end of the stow clip 700 is secured to a side rail 102. This allows the handle 500, 500' to quickly and easily be attached to the side rail 102 without having to attach and/or reattach the stow clip 700.

While FIGS. 10C-10J and the discussion above show and describe optional features of handle 500 and their interaction with features of stow clip 700, it should be noted that each of these figures and the discussion above can apply equally to handle 500'. For example, handle 500' can include the internal structure that interacts with the arms 706 of stow clip 700 that is described above with reference to handle 500.

Hook Support

Figure 12:
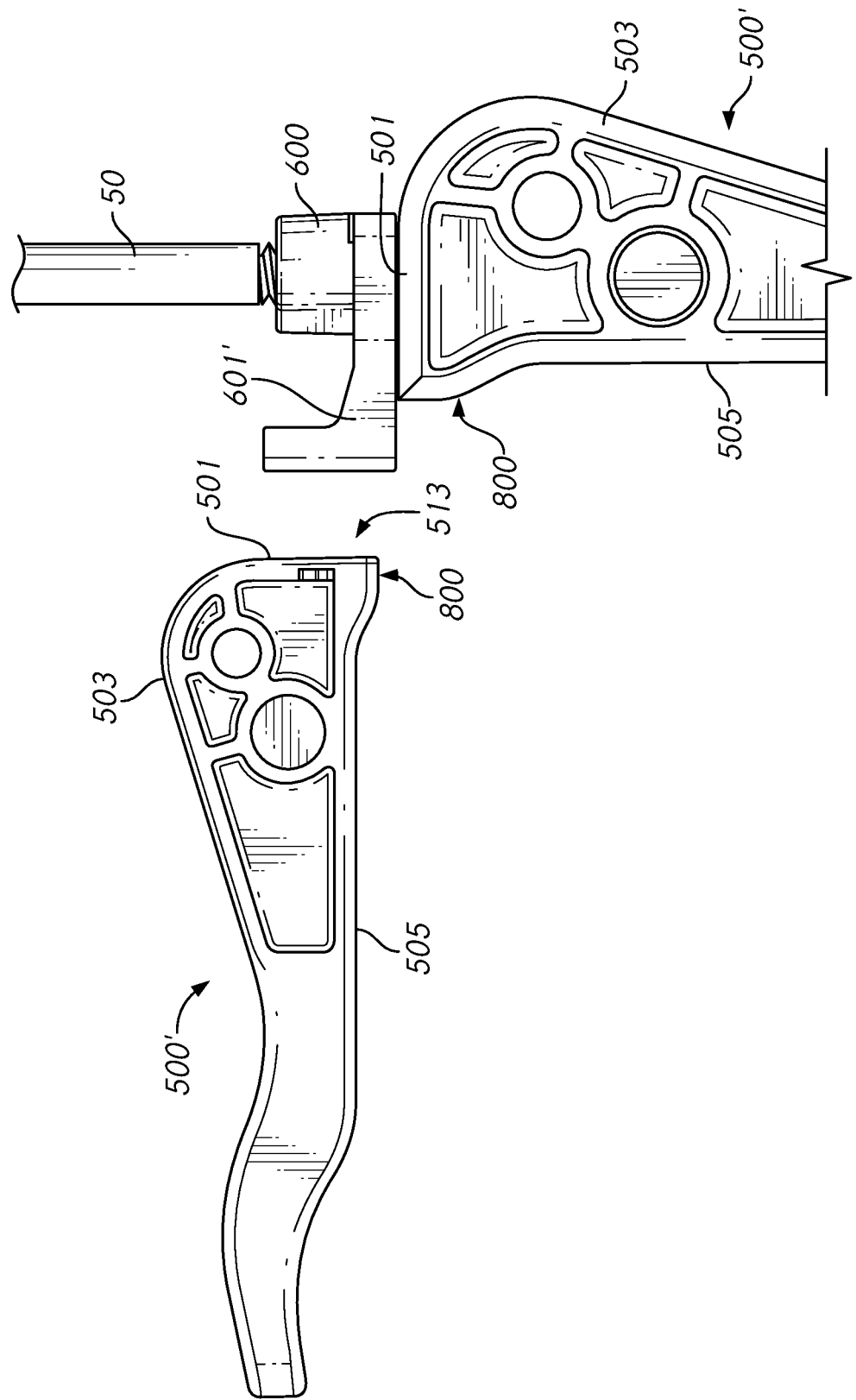
FIG. 12 illustrates embodiments of a handle having a hook support in accordance with aspects of this disclosure.

FIG. 12 illustrates a feature that can be included in some embodiments of the handles of the present disclosure. As shown, the handle 500' can include a hook support 800 (also referred to herein as "hook protrusion" or "hook extension") extending along a front surface 505 that is attached, contacting, secured, and/or engaged to the cam follower 600'. While FIG. 11 illustrates the hook support 800 feature with respect to handle 500', such hook support 800 can be included in handle 500 as well. The hook support 800 can provide further support when rotating the handle 500' about the bow slide 400 and/or bow hanger 340 to close the latch 601' of the cam follower 600' onto a portion of a vehicle. The hook support 800 can reduce cantilever forces that arise when the clamp assembly 300 is in a clamped or closed position, thus preventing limiting breakage or fracture of components of the assembly 300, such as the handle 500 and/or cam follower 600'. Accordingly, instead of the front surface 505 extending generally straight and flat to the top surface 501, the front surface 505 curves generally outward near the first end 513 to form the hook support 800. The hook support 800 can extend a length that is 1%, 2%, 3%, 4%, 5%, 10%, 15%, or 20% of a length of the front surface 505 of the handle 500'. In some embodiments, the hook support 800 can extend a length greater than 1%, 2%, 3%, 4%, 5%, 10%, 15%, or 20% of a length of the front surface 505 of the handle 500'. In some embodiments, the hook support 800 can extend a length less than 1%, 2%, 3%, 4%, 5%, 10%, 15%, or 20% f a length of the front surface 505 of the handle 500'. While FIG. 12 illustrates hook support with respect to handle 500', the hook support could be equally incorporated into the structure of handle 500.

Methods of Assembly

Figure 13E:
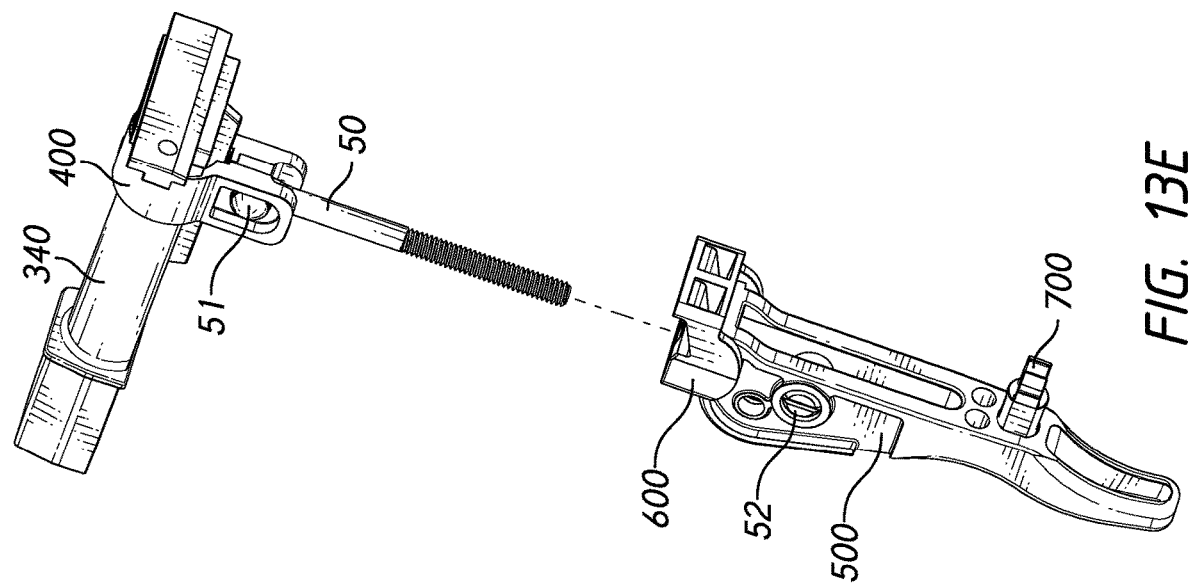
Figure 13D:
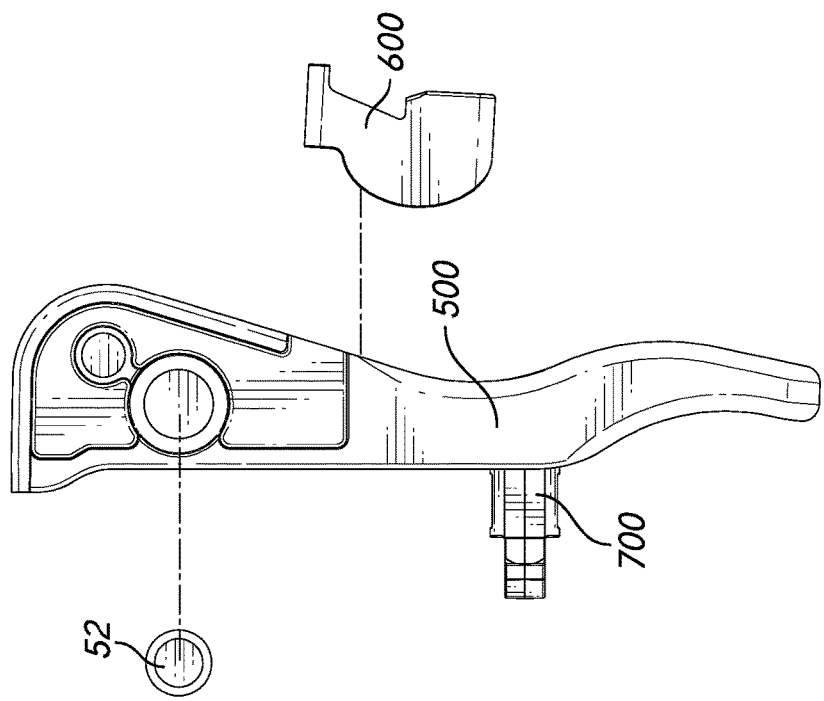

FIGS. 13A-13E illustrate methods of assembling a clamp assembly such as clamp assembly 300. As shown by FIG. 13A and as discussed elsewhere herein, bow slide 400 include separable and/or openable arms which allow it to be secured atop and/or around bow hanger 340. In some embodiments, bow slide 400 include an indicator 441 (see FIGS. 6E-6F), which can be an arrow, that can indicate which direction the bow slide 400 should be secured and/or placed over the bow hanger 340. Such proper positioning of the bow slide 4000 over the bow hanger 340 can be important so that the back wall 419 (FIGS. 6B-6D) of the bow slide 400 properly limits rotation of the hanger bolt 50 with respect to the bow slide 400 (and/or other connected components of the clamp assembly 300). In some embodiments, the bow slide 400 is configured such that it can snap onto the bow hanger 340. Further, as shown by FIG. 13B, a hanger bolt 50 can be inserted through a portion of the bow slide 400 (such as a cavity or opening in a body 404 as shown and discussed above), and a fastener 51 (such as a spade bolt) can be inserted through an opening in the bow slide 400 and an opening in hanger bolt 50 so as to secure the hanger bolt 50 to the bow slide. As shown in FIG. 13C, a stow clip 700 can be secured to a portion of handle 500, for example, as discussed above. As shown by FIG. 13D, a cam follower 600 can slide on the cam or rails 506 of the handle 500. After the cam 600 is positioned along the cam or rails 506 of handle 500, a fastener 52 (such as a cylinder nut) can be inset into an opening in the handle 500 as shown. As shown in FIG. 13E, the cam follower 600, handle 500, and the stow clip 700 can be secured to the bow hanger 340 and/or bow slide 400 by rotatably and/or threadingly secured a threaded portion of hanger bolt 50 and a threaded hole of the cylinder nut 52. While the above method is described with reference to handle 500 and cam follower 600, such description is equally applicable to handle 500' and cam follower 600'

From the foregoing description, it will be appreciated that an inventive tonneau cover clamp assembly is disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A tonneau cover configured to cover at least a portion of a truck bed of a vehicle, the tonneau cover comprising:

a cover;
a frame configured to provide vertical support for the cover, the frame comprising a pair of side rails configured to extend along top surfaces of side walls of the truck bed of the vehicle, the frame further comprising a plurality of bows configured to extend across the truck bed and between the pair of side rails; and
a clamp assembly configured to secure the frame to the side walls of the truck bed, the clamp assembly comprising:
  a bow hanger comprising a first end, a second end opposite the first end, a main body extending between the first and second ends, and a protrusion extending away from the main body and along a portion of a length of the main body, wherein the first end is configured to secure to one of the pair of side rails and the second end is configured to secure to an end of one of the plurality of bows;
  a bow slide comprising:
    a head having an aperture, the head configured to surround and move along the length of the main body of the bow hanger; and
    a slot configured to receive the protrusion of the bow hanger and prevent rotation of the bow slide with respect to the bow hanger;
  a hanger bolt secured to a portion of the bow slide;
  a cam follower having an opening sized to receive the hanger bolt, the cam follower comprising at least one retainer and a latch; and
  a handle configured to secure to a portion of the hanger bolt, the handle comprising at least one ridge extending from a surface of the handle, the at least one ridge configured to engage the at least one retainer of the cam follower, wherein rotation of the handle causes the cam follower to move between a clamped position and an unclamped position, and wherein, in the clamped position, the latch of cam follower is positioned closer to the bow slide than in the unclamped position.

2. The tonneau cover of claim 1, wherein the main body of the bow hanger comprises a partially circular cross section.

3. The tonneau cover of claim 2, wherein the cross section of the main body of the bow hanger comprises a circular portion and a flat portion, and wherein the protrusion extends from the flat portion of the cross section of the main body.

4. The tonneau cover of claim 1, wherein the bow slide further comprises a body portion connected to the head, the body portion comprising a first arm and a second arm, the first and second arms being movable with respect to one another such that the bow slide can be removably attached around the bow hanger.

5. The tonneau cover of claim 1, wherein the bow hanger comprises a tail portion at the second end that is integral with the main body, the tail portion having a larger cross section than a cross section of the main body.

6. The tonneau cover of claim 1, wherein the head of the bow slide is configured to be at least partially circumferentially rotatable around a portion of the main body of the bow hanger that does not comprise the protrusion.

7. The tonneau cover of claim 1, wherein the at least one ridge of the handle extends from an interior surface of the handle.

8. The tonneau cover of claim 7, wherein the cam follower comprises a stem extending from a bottom surface of the cam follower, the stem configured to fit at least partially within a slot in the handle, and wherein the at least one retainer extends outwardly from the stem towards the interior surface of the handle and engages the at least one ridge of the handle.

9. The tonneau cover of claim 1, wherein the handle comprises:
  a first end and a second end opposite the first end, the first end configured to contact the cam follower when the clamp assembly is in use;
  a first side extending between the first and second ends and configured to face the side walls of the truck bed when the clamp assembly is in use and a second side opposite the first side; and
  a hook support extending away from the first side at the first end, the hook support configured to reduce a cantilever force on the first end of the handle when in use.

10. The tonneau cover of claim 1, further comprising a gripper.

11. The tonneau cover of claim 10, wherein the gripper is integral with the handle.

12. The tonneau cover of claim 10, wherein the gripper comprises a stow clip having a first end and a second end opposite the first end, wherein the first end is configured to secure to a portion of the handle and the second end is configured to secure to a portion of the side rail, and wherein the stow clip is configured to stay secured to the handle after disengagement of the clip with the side rail.

13. The tonneau cover of claim 12, wherein the first end comprises at least one arm configured to secure within at least one slot extending through a width of the handle, and wherein the second end comprises at least one arm configured to secure within a portion of the side rail.

14. The tonneau cover of claim 1, wherein the slot of the bow slide is proximate the aperture of the head of the bow slide.

15. The tonneau cover of claim 1, wherein the aperture of the head is circular and the slot is non-circular.

16. The tonneau cover of claim 1, wherein the protrusion extends away from a bottom surface of the main body, the bottom surface facing a floor of the truck bed when the clamp assembly is in an installed position.

17. The tonneau cover of claim 1, wherein the cam follower comprises two retainers and the handle comprises two ridges.

18. A clamp assembly configured to secure a tonneau cover to a vehicle, the clamp assembly comprising:
  a bow hanger comprising a first end and a second end opposite the first end;
  a bow slide configured to move along at least a portion of the bow hanger between the first and second ends of the bow hanger;
  a hanger bolt configured to secure to a portion of the bow slide;
  a handle configured to secure to a portion of the hanger bolt, the handle comprising at least one ridge extending from an interior surface of the handle; and
  a cam follower having an opening sized to receive the hanger bolt, the cam follower comprising a latch and a stem, the stem configured to fit at least partially within a slot in the handle, wherein the stem comprises at least one retainer extending outwardly from the stem towards the interior surface of the handle, the at least one retainer configured to engage the at least one ridge of the handle;
  wherein rotation of the handle with respect to the hanger bolt causes the cam follower to move between a first position and a second position, and wherein, in the first position, the latch of cam follower is positioned closer to the bow slide than in the second position.

19. The clamp assembly of claim 18, wherein the stem of the cam follower comprises two retainers extending from the stem in opposite directions, and wherein the handle comprises two ridges extending from two interior surfaces of the handle, the two interior surfaces of the handle facing each other.

20. The clamp assembly of claim 19, wherein the stem extends from a bottom surface of the cam follower, wherein the bottom surface of the cam follower faces a direction away from a direction that the latch of the cam follower faces.

21. A clamp assembly configured to secure a tonneau cover to a vehicle, the clamp assembly comprising:
   a bow hanger comprising a first end and a second end opposite the first end;
   a bow slide configured to move along at least a portion of the bow hanger between the first and second ends of the bow hanger;
   a hanger bolt configured to secure to a portion of the bow slide;
   a handle configured to secure to a portion of the hanger bolt, the handle further configured for rotation with respect to the hanger bolt; and
   a gripper, the gripper comprising a first end and a second end opposite the first end, the first end configured to secure to a portion of the handle and the second end configured to secure to a portion of a side rail of the tonneau cover, wherein the gripper is configured to stay secured to the handle after disengagement of the gripper with the side rail.

22. The clamp assembly of claim 21, wherein the gripper is integral with the handle.

23. The clamp assembly of claim 21, wherein the first end of the gripper comprises at least one arm configured to secure within at least one slot extending through a width of the handle, and wherein the second end of the gripper comprises at least one arm configured to secure within a portion of the side rail.

24. The clamp assembly of claim 23, wherein the at least one arm of the first end of the gripper extends in at least two directions.

* * * * *